(12) United States Patent
Koziarz

(10) Patent No.: US 7,724,974 B2
(45) Date of Patent: May 25, 2010

(54) EFFICIENT HALFTONE IMAGE COMPRESSION

(75) Inventor: Krzysztof Koziarz, Denistone (AU)

(73) Assignee: Canon Kabushiki Kaisha, Tokyo (JP)

(*) Notice: Subject to any disclaimer, the term of this patent is extended or adjusted under 35 U.S.C. 154(b) by 823 days.

(21) Appl. No.: 11/615,146

(22) Filed: Dec. 22, 2006

(65) Prior Publication Data

US 2007/0154106 A1 Jul. 5, 2007

(30) Foreign Application Priority Data

Dec. 23, 2005 (AU) .............................. 2005248949

(51) Int. Cl.
*G06K 9/36* (2006.01)
(52) U.S. Cl. ................................... 382/244
(58) Field of Classification Search ......... 382/232–251; 375/240.01–240.27; 358/426.01–426.16; 341/50–51, 55, 59, 86–87, 106–107; 707/1–6
See application file for complete search history.

(56) References Cited

U.S. PATENT DOCUMENTS

| RE33,632 | E | * | 7/1991 | Nakamura et al. .......... 382/247 |
| 5,177,622 | A | | 1/1993 | Yoshida et al. .............. 358/429 |
| 5,740,278 | A | * | 4/1998 | Berger et al. ................ 382/232 |
| 5,901,251 | A | | 5/1999 | Rust ............................ 382/247 |
| 5,930,790 | A | * | 7/1999 | Law et al. ...................... 707/6 |
| 6,038,346 | A | * | 3/2000 | Ratnakar ..................... 382/239 |
| 6,199,064 | B1 | | 3/2001 | Schindler ........................ 707/7 |
| 6,563,956 | B1 | | 5/2003 | Satoh et al. ................. 382/245 |
| 6,741,368 | B1 | | 5/2004 | Hoel ........................... 358/1.9 |
| 6,983,074 | B1 | * | 1/2006 | Clauson et al. ............. 382/244 |
| 2003/0107753 | A1 | | 6/2003 | Sakamoto .................... 358/1.9 |

FOREIGN PATENT DOCUMENTS

| EP | 0 797 348 A2 | 9/1997 |
| WO | WO 2004/028142 A2 | 4/2004 |

OTHER PUBLICATIONS

Storer, J. A., et al., "Lossless Image Compression by Block Matching", The Computer Journal, vol. 40, No. 2/3, 1997.*

* cited by examiner

*Primary Examiner*—Sherali Ishrat
(74) *Attorney, Agent, or Firm*—Fitzpatrick, Cella, Harper & Scinto

(57) ABSTRACT

An image compression algorithm (10) and complementary decompression algorithm (20) are disclosed. The compression algorithm (10) maintains a set of reference points (610, 611, 612 and 613), each reference point having a predetermined spatial relationship with a current pixel (600). An adjustment along scanlines of the reference points is determined. Each of the reference points (611, 612 and 613) is then adjusted by the determined adjustment. A search for a match between one of the strings of consecutive previously scanned pixels including one of the adjusted reference pixels and the string of consecutive pixels including the current pixel is then conducted, and if a match is found, then an identifier for the reference pixel included in the match and the length of the matching string of consecutive pixels are encoded to an output stream.

18 Claims, 14 Drawing Sheets

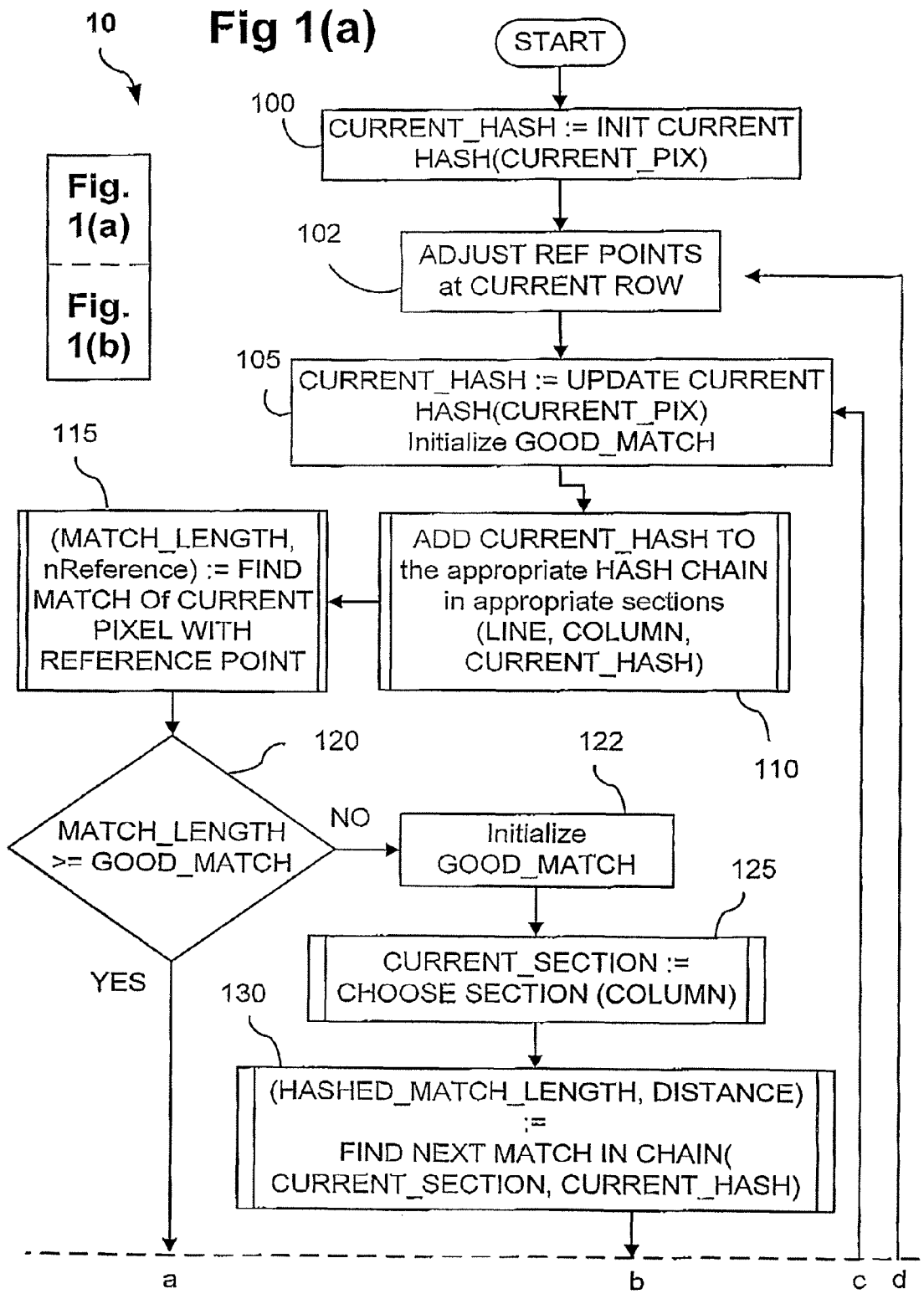

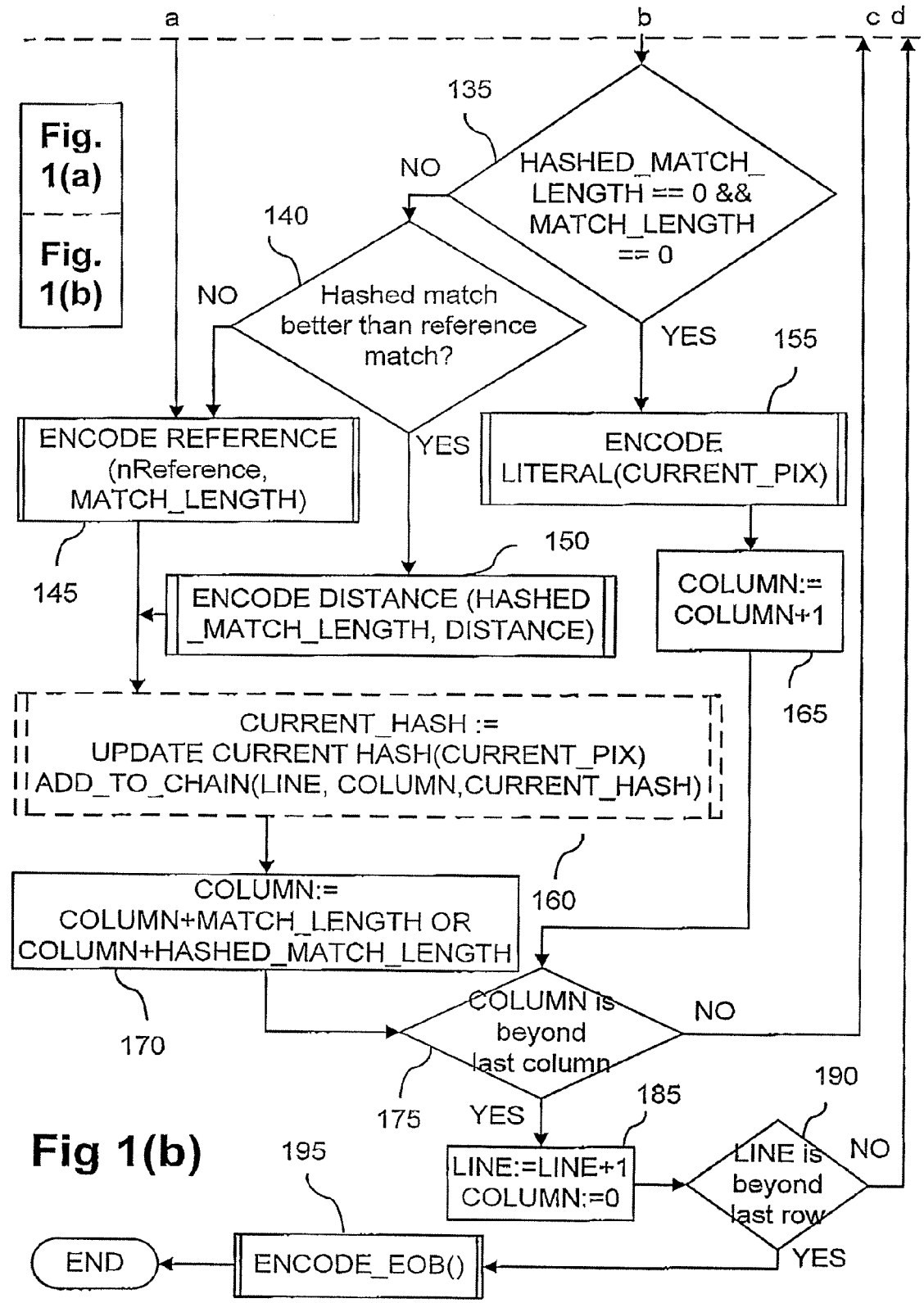

EFFICIENT HALFTONE IMAGE COMPRESSION

FIELD OF THE INVENTION

The present invention relates generally to lossless image compression and, in particular, to compression of halftoned images.

BACKGROUND

Data compression may be described as a process that converts data in a given format into an alternative format, with the data in the alternative format requiring less storage space, or transmission time, than the original data.

LZ77 and LZ78 are the names for the two lossless data compression algorithms, published in 1977 and 1978 respectively, and named after the authors A. Lempel and J. Ziv of the algorithms. Since that time the LZ77 and LZ78 algorithms have also formed the basis for many other compression algorithms, including LZW, LZSS and LZRW. These compression algorithms are known as dictionary coders.

The LZ77 dictionary coder operates by keeping a history window of the most recently processed input data. A comparison is then made between the current input data, that is the data that is currently being encoded, and the data in the history window. The output stream of the coder, that is the compressed stream, is made up from references to the position in the history window of any matches, and the length of such matches. If a match cannot be found the character itself is simply encoded into the compressed stream.

The LZRW algorithm has proven to be very fast, but has a poor compression ratio. The LZ78 algorithm, and algorithms based thereon such as LZW, requires significant storage in the decoder. The LZ77 dictionary coder has the advantages that its compression ratio is very good for many types of data, and its decoding is very simple and fast. Accordingly, the LZ77 algorithm has formed the basis of the gzip compression utility written by Jean-loup Gailly and adopted by the GNU Project, accessible on http://www.gzip.org/. The LZ77 algorithm is also used in the lossless Portable Network Graphics (PNG) image compression format. However, encoding using the LZ77 algorithm is often time-consuming due to the number of comparisons to be performed, which is a particular problem when applied to highly redundant data, such as halftoned images.

The previously mentioned gzip compression utility also uses a fixed Huffman scheme. As a result, two passes over the input data are required in order to collect probabilities. This exposes known issues with fixed Huffman coding namely, the impossibility of optimally coding symbols that have non-power 2 probabilities, and the necessity to send a coding tree along with the compressed data. Frequent restarting of the encoder is required to maintain adaptiveness to different patterns in the data. Adaptive Huffman coders, which perform the coding process in one pass, and arithmetic coders, which are optimal in terms of statistical probability, on the other hand are very slow.

Even though the original LZ77 and LZ78 algorithms were developed for 1-dimensional data streams, some 2-dimensional LZ schemes have been proposed recently, such as that by Storer et al.: "Lossless Image compression by block matching" published in, The Computer Journal 1997, vol40, pp. 137-145. Although the algorithm proposed by Storer outperforms the LZ77 algorithm with regards to compression ratio when applied to images, the memory requirements and time performance do not match those of the simpler 1-dimensional LZ77 algorithm.

Encoding formats have also been developed for facsimile transmissions, such as the Fax Group 3, also known as G3, and the Fax Group 4, also known as G4 encoding formats used for Tagged Image File Format (TIFF) files. The G3 format is the more commonly used format, and supports one-dimensional image compression of black and white images. As the G3 and G4 encoding formats have been developed for bi-level images containing large amounts of flat regions, like scanned text, such encoding formats do not perform well on halftoned images.

State of the art lossless bi-level image compression schemes, such as the Joint Bi-level Image experts Group (JBIG) compression scheme, only achieve moderate compression ratios on halftoned images due to the periodic dot structure appearing in halftoned images. As a result there have been some efforts to develop "hand-crafted" fast image compression schemes which are based on the knowledge of the dither matrices used in halftoning. Some of these compression schemes have very good time performance, but provide only moderate compression ratios. However, because these compression schemes rely on knowledge of the exact pattern of the dither matrix, and because the exact pattern cannot always be known, these compression schemes often fail.

SUMMARY

It is an object of the present invention to substantially overcome, or at least ameliorate, one or more disadvantages of existing arrangements.

Disclosed are arrangements which seek to address the above problems by providing an image compression algorithm that exploits the correlation of pixels within scanline-ordered raster images and the periodic pixel values of halftoned images.

According to an aspect of the present invention, there is provided a method of compressing an image to an output stream, said image consisting of a plurality of pixels arranged in scanlines, said method comprising the steps of;

(a) maintaining a set of reference points, each reference points having a predetermined spatial relationship with a current pixel;

(b) determining an adjustment along said scanlines of said reference positions;

(c) adjusting each of said reference points by said adjustment;

(d) searching for a match between a string of consecutive pixels including said current pixel and each of the strings of consecutive previously scanned pixels including respective adjusted reference points;

(e) if a match is found, encoding an identifier for the reference point included in the match and the length of said string of consecutive pixels, to said output stream; and (f) repeating at least steps (d) and (e) for the pixel after the end of said string of consecutive pixels including said current pixel.

According to another aspect of the present invention, there is provided a method of compressing an image to an output stream, said image consisting of a plurality of pixels arranged in scanlines, said method comprising the steps of:

(a) searching for a string of consecutive previously scanned pixels that matches a string of consecutive pixels including a current pixel by searching strings of consecutive previously scanned pixels having at least one pixel in vertical proximity to said current pixel;

(b) if a match is found, encoding the distance from said current pixel to the string of consecutive previously scanned pixels, and the length of said string of consecutive pixels, to said output stream; and (c) repeating steps (a) and (b) for the pixel after the end of said string of consecutive pixels including said current pixel, wherein the extent of pixels considered to be in vertical proximity to said current pixel is less than the length of said scanlines.

According to yet another aspect of the present invention, there is provided an apparatus for implementing any one of the aforementioned methods.

According to yet another aspect of the present invention there is provided a computer program product including a computer readable medium having recorded thereon a computer program for implementing any one of the method described above.

Other aspects of the invention are also disclosed.

BRIEF DESCRIPTION OF THE DRAWINGS

One or more embodiments of the present invention will now be described with reference to the drawings, in which:

FIGS. 1A and 1B show a schematic flow diagram of an image compression algorithm according to an embodiment of the present invention;

DETAILED DESCRIPTION

It is to be noted that the discussions contained in the "Background" section relating to prior art arrangements relate to discussions of algorithms or compression schemes which form public knowledge through their respective publications. Those discussions should not be interpreted as a representation by the present inventors or patent applicant that such publications in any way form part of the common general knowledge in the art.

Figure 8:
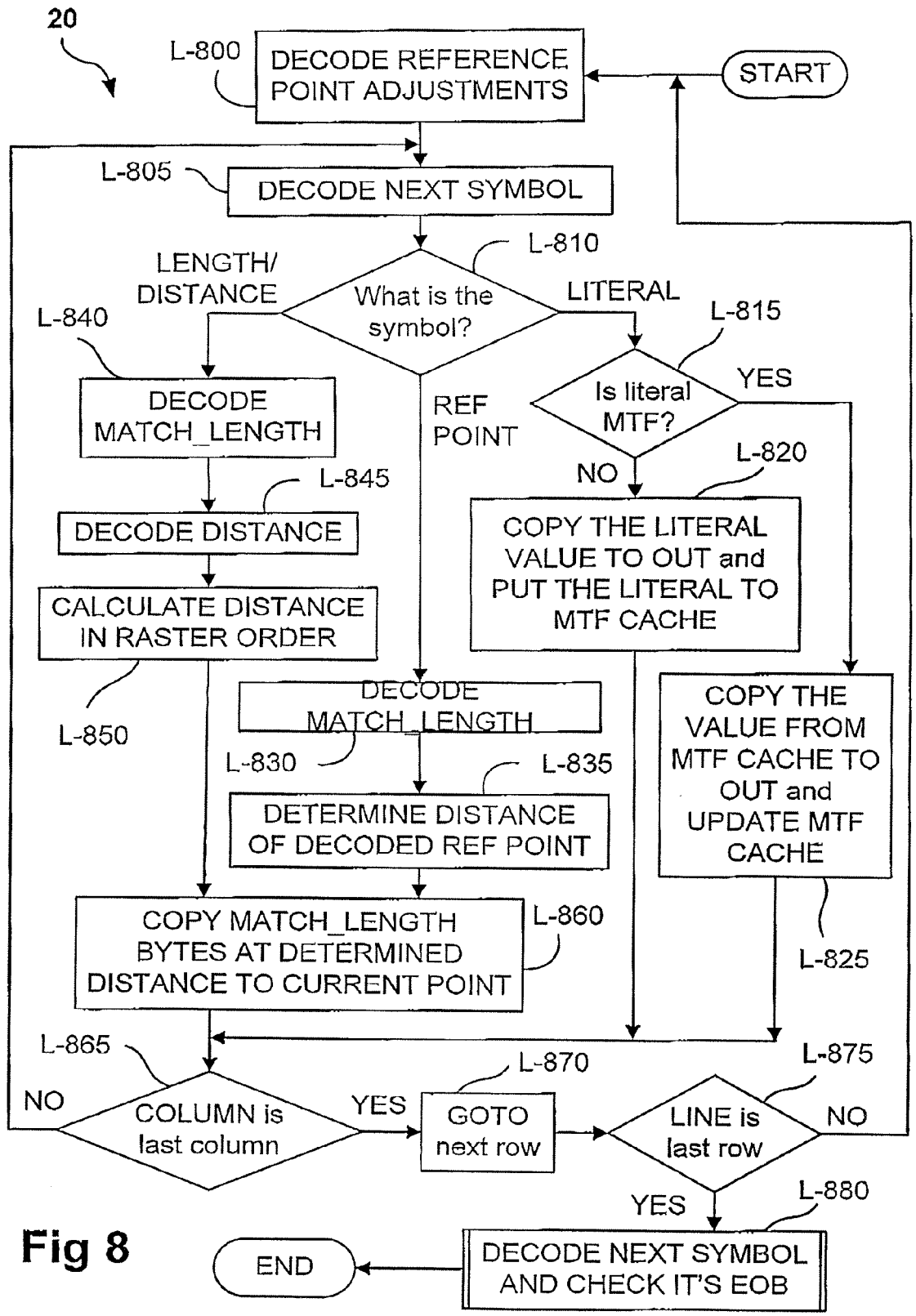
FIG. 8 shows a schematic flow diagram of an image decompression algorithm which is complementary to the compression algorithm of FIG. 1.
Figure 9:
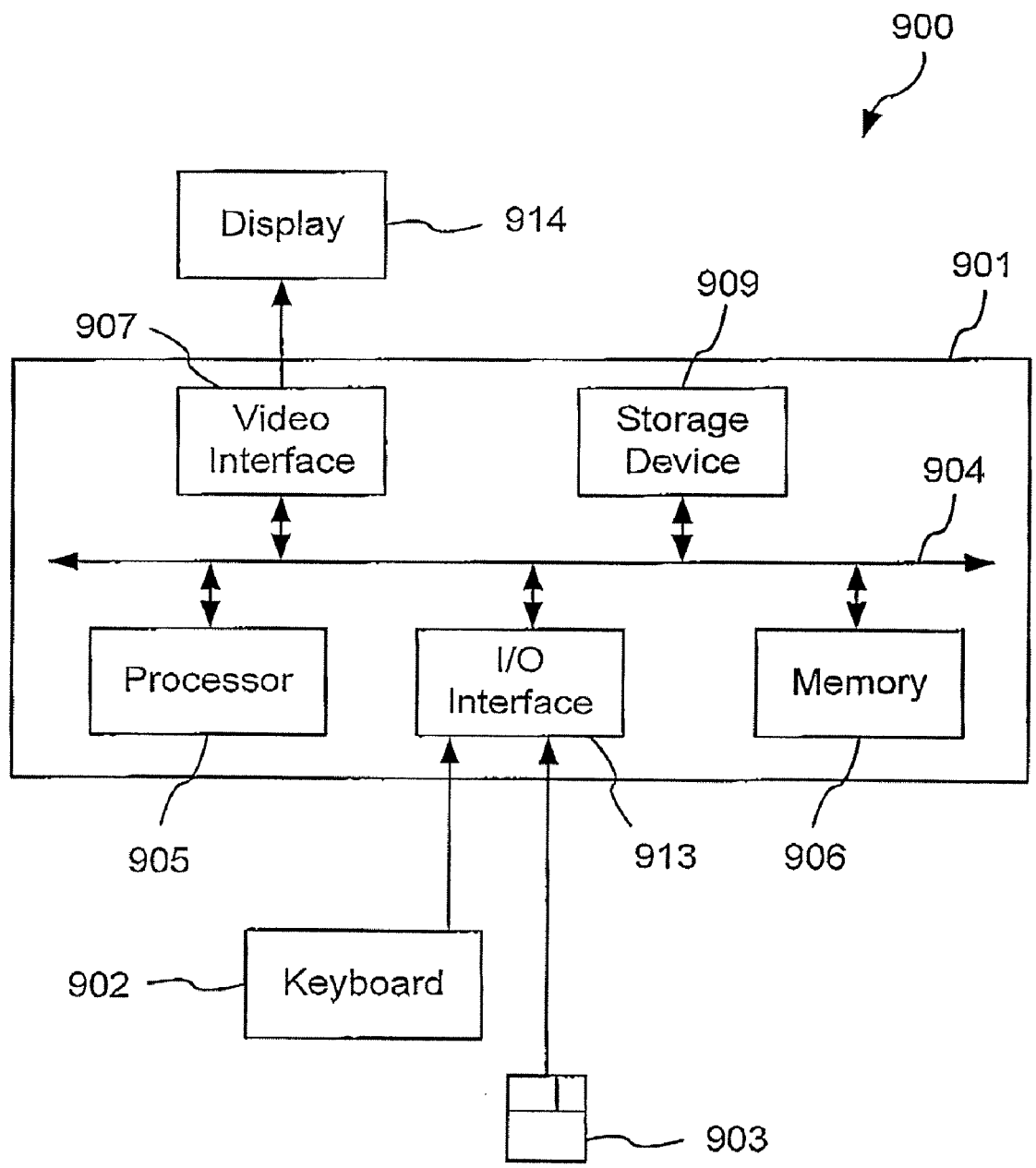
FIG. 9 shows a schematic block diagram of a general purpose computer upon which arrangements described can be practiced.

FIG. 1 shows a schematic flow diagram of an image compression algorithm 10 according to an embodiment of the present invention. FIG. 8 shows a schematic flow diagram of a decompression algorithm 20 which is complementary to the compression algorithm 10. The image compression algorithm 10 and decompression algorithm 20 are preferably practiced using a general-purpose computer system 900, a schematic block diagram of which is shown in FIG. 9. The image compression algorithm 10 and decompression algorithm 20 are implemented within the computer system 900 as software, such as an application program. In particular, the steps of the image compression algorithm 10 and decompression algorithm 20 are effected by instructions in the software that are carried out by the computer system 900.

The software may be stored in a computer readable medium, including the storage devices described below, for example. The software is loaded into the computer system 900 from the computer readable medium, and then executed by the computer system 900. A computer readable medium having such software or computer program recorded on it is a computer program product. The use of the computer program product in the computer system 900 preferably effects an advantageous apparatus for compressing images.

The computer system 900 is formed by a computer module 901, input devices such as a keyboard 902 and mouse 903, output devices including a display device 914. The computer module 901 typically includes at least one processor unit 905, and a memory unit 906. The module 901 also includes an number of input/output (I/O) interfaces including a video interface 907 that couples to the video display 914, and an I/O interface 913 for the keyboard 902 and mouse 903. A storage device 909 is also provided, and typically includes a hard disk drive and a floppy disk drive. The components 905 to 913 of the computer module 901 typically communicate via an interconnected bus 904 and in a manner which results in a conventional mode of operation of the computer system 900 known to those in the relevant art.

Typically, the application program is resident on the storage device 909 and read and controlled in its execution by the processor 905. In some instances, the application program may be supplied to the user encoded on a CD-ROM or floppy disk and read via a corresponding drive, or alternatively may be read by the user from a network via a modem device. Still further, the application program can also be loaded into the computer system 900 from other computer readable media. The term "computer readable medium" as used herein refers to any storage or transmission medium that participates in providing instructions and/or data to the computer system 900 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 901.

The image compression algorithm 10 and decompression algorithm 20 may alternatively be implemented in dedicated hardware, such as one or more integrated circuits. Such dedicated hardware may include graphic processors, digital signal processors, or one or more microprocessors and associated memories.

The image compression algorithm 10 is a sliding window data compression algorithm in that the image compression algorithm 10 maintains a history buffer containing processed input data in a first-in-first-out (FIFO) manner. That buffer is then searched for sequences of data identical to the data presently being processed. If a match is found, the data presently being processed is substituted in an output stream with parameters identifying the match. The parameters include the distance to the matching data in the history buffer, and the length of the sequence of matching data. In an alternative implementation the distance may by represented as the address of a string representing the matching data in a lookup table. In this respect the image compression algorithm 10 is similar to known dictionary coders, such as the LZ77 and LZ78 compression, algorithms described in the "Background" section.

Image data typically contains some redundancies both in the horizontal and vertical directions. However, the LZ77 compression algorithm, being developed for 1-dimensional data, does not exploit any of the redundancies that may exist in the vertical direction. The image compression algorithm 10 differs from the LZ77 compression algorithm by exploiting redundancy between pixel values in different rows of the image. This is done by defining a section of pixel locations, or points, that are compared for matches. The section comprises pixel locations in vertical proximity to the pixel location associated with the data presently being processed. The data referenced by the section has a higher probability of matching with the data presently being processed than data in other sections.

Figure 6:
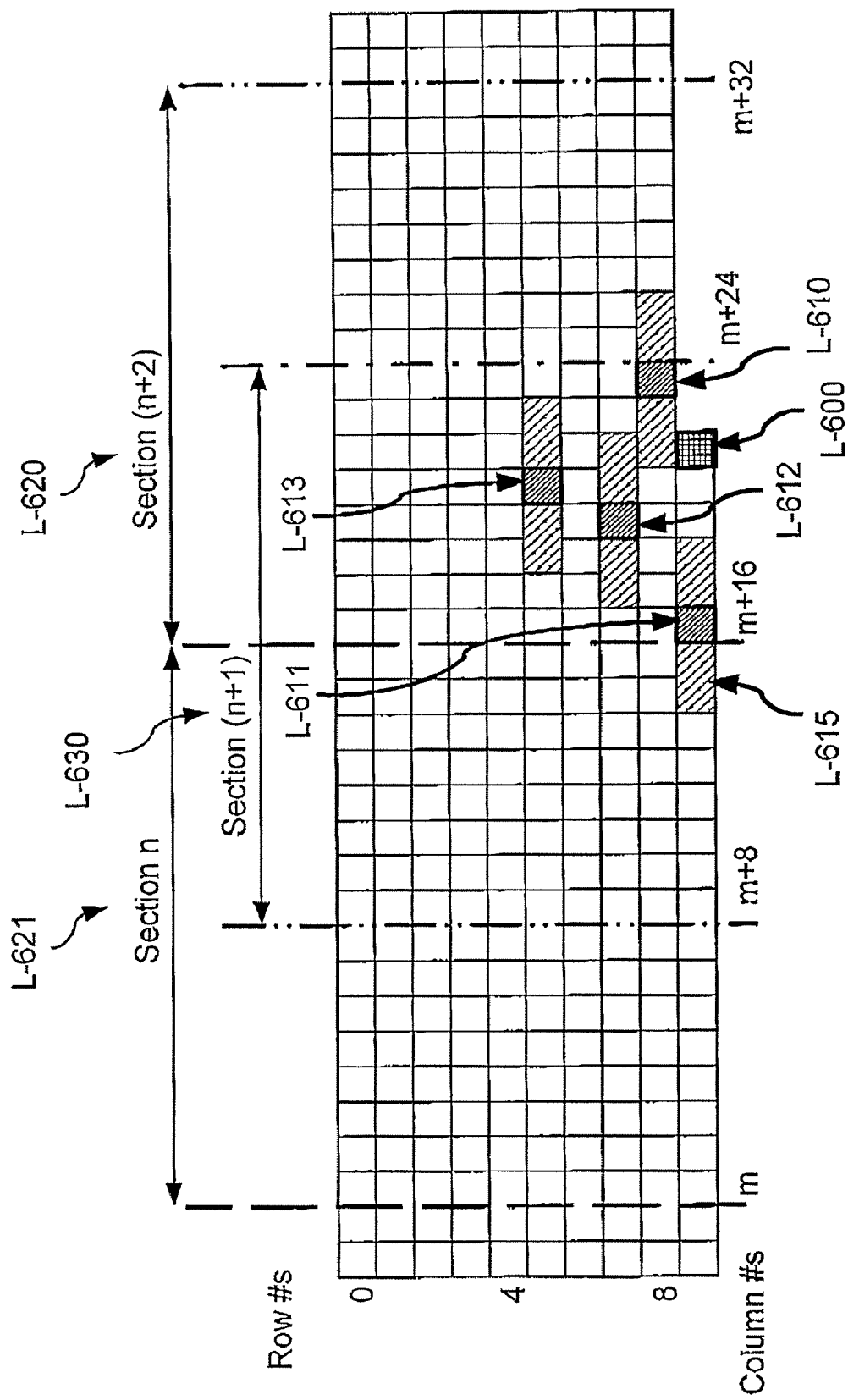
FIG. 6 shows an example of an encoder state in context of the pixels of an image being compressed.

FIG. 6 shows a partial view of a halftoned image being compressed using the image compression algorithm 10. As is usually the case, each pixel position is represented within a grid of rows and columns. The image compression algorithm 10 divides the width of the image into a number of rectangular sections, each section covering an identical span of columns, the span being less than the width of the image. Examples of such sections 620, 621 and 630 are illustrated in FIG. 6, with each section 620, 621 and 630 having span width of 16 columns and an overlapping of 8 columns. In the preferred implementation sections are arranged so as to cover a span width of 64 columns and overlap by 32 columns.

As noted above, the data associated with pixel location 600, also termed the focus point 600, is being compared with data associated with pixel locations in vertical proximity to the focus point 600. In the preferred implementation the data associated with the focus point 600 is compared with the data associated with the pixel locations in the section for which the current focus point 600 is closest to the centre of the span of that section, which is section 620 for the present focus point 600.

In algorithm 10 a number of reference points 610, 611, 612 and 613 are identified. Each reference point 610, 611, 612 and 613 has a predetermined spatial relationship with the current focus point 600. Accordingly, each time the focus point 600 advances the reference points 610, 611, 612 and 613 also change. As will be described in detail below, the strings of data starting at the respective reference points 610, 611, 612 and 613 are tested first for finding a match with the string of data starting at the focus point 600 before the data in the section 620 in vertical proximity to the focus point 600 is tested.

It is noted that when a typical LZ77-based compression scheme is applied to an image, the buffer storing the history window is typically only sufficient to hold the data associated with a very small number of rows of pixels. Accordingly, if a best match is present at the reference point 613, which is located 4 rows above the focus point 600, the data associated with reference point 613 would typically no longer be present in the buffer maintained by the typical LZ77-based compression scheme. Alternatively, should the buffer size be increased for the LZ77-based compression scheme, the large raster-scan-order distance between the focus point 600 and that reference point 613 has the effect that the raster-scan-order distance cannot be coded using a short code.

Another problem with the typical LZ77 approach when applied to halftone image data is significant redundancy of information. As the result of halftoning, certain patterns of strings appear far more often than others, which causes the hashing scheme not to distribute the keys uniformly, thus impairing the timing performance. Those skilled in the art of LZ77 data compression would understand the importance of uniform distribution of hash keys across the whole history buffer. If the distribution is not uniform, the effect of multiple keys colliding with the same entrance into the hash chain array slows down the process of searching for a match. In order to avoid such a slowdown, some implementations of the LZ77 compression scheme shorten the hash chains by discarding older hash entries, but that has the effect of degrading the compression ratio.

In certain implementations of the LZ77 compression scheme a dictionary is maintained in the form of a hash table, containing entries pointing to the location of possible partial matches that occurred within the history buffer. Such entries are usually stored as linked lists, with each linked list identifying all the occurrences of a given k-byte substring of data in the history buffer. As a result, the entries are generally referred to as "hash chains".

Figure 7:
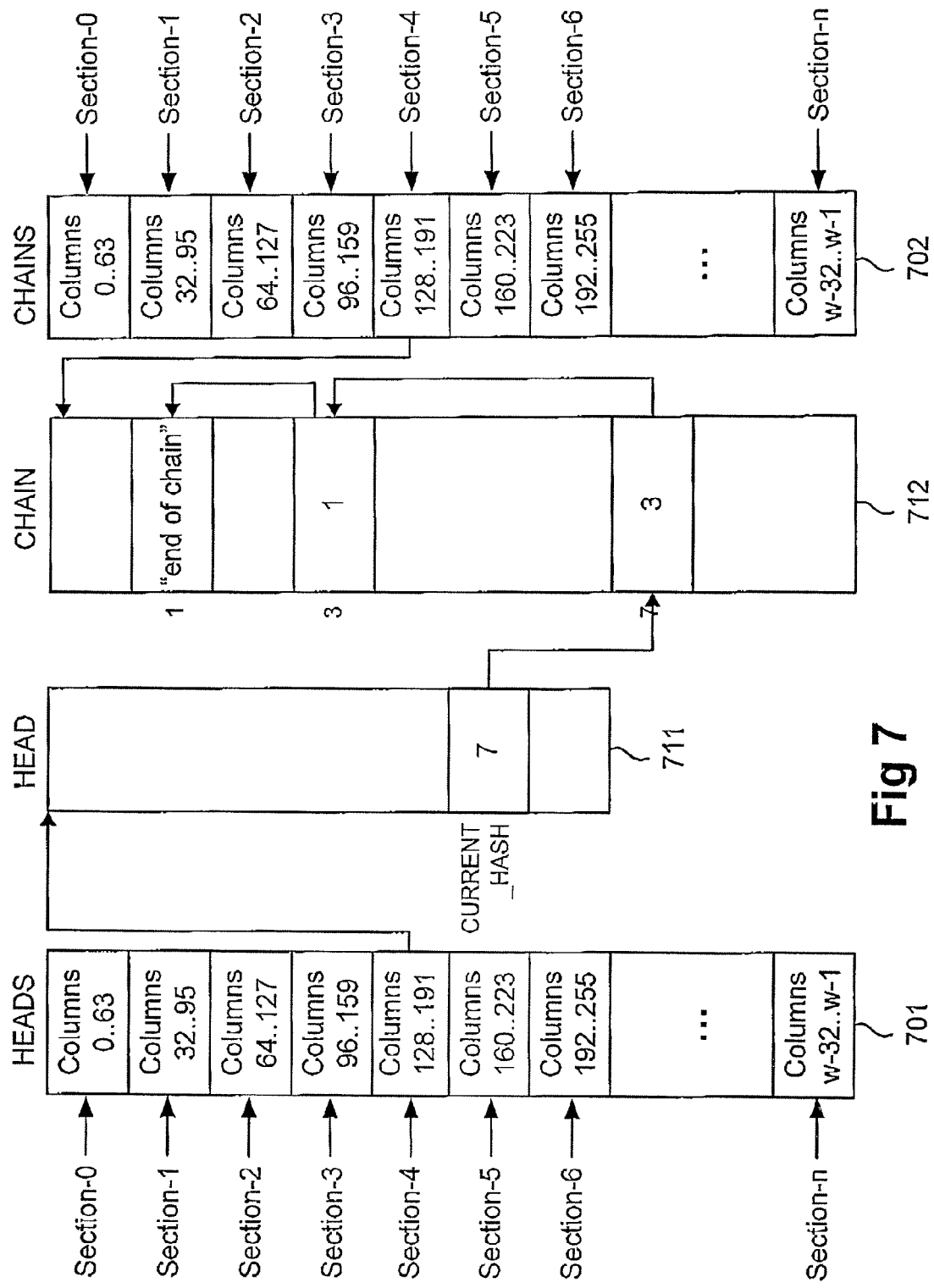
FIG. 7 shows example hash chain section arrays according to the embodiment of the present invention.

FIG. 7 shows an example of hash chain section arrays as implemented by the image compression algorithm 10. The illustrated example is for a section size of 64 columns, overlapped by half that size (32 columns), which corresponds with the preferred section widths into which the width of the image is divided. The arrays include a HEADS array 701 and a CHAINS array 702. The entries in the HEADS array 701 and the CHAINS array 702 contain the mappings from the range of columns in which the strings of data are found, to the section associated with the range of columns.

The arrays further include HEAD tables and CHAIN tables. Each entry of the HEADS array 701 has an associated HEAD table. Similarly, each entry of the CHAINS array 702 has an associated CHAIN table. Only one HEAD table 711 and one CHAIN table 712 (for section 4) are illustrated. Each entry in the HEAD table 711 holds a start value of a hash key list, or hash chain. That entry also points to a register in the CHAIN table 712, where the next entry of the hash key list is stored, which also acts as a pointer to another register in the CHAIN table 712 where the next entry is stored.

For the example a hash chain for the hash value CURRENT_HASH in section 4 is illustrated. The hash value CURRENT_HASH points to an entry in the HEAD table 711 containing the entry "7". For the reasons stated above, the entry "7" is the start value of the hash key list, and also points to register 7 in the CHAIN table 712. The entry in register 7 of the CHAIN table 712 in turn points to the entry in register 3, which in turn points to the entry in register 1. The entry in register 1 contains an "end of chain" marker, which is the sentinel for the end of the list. Hence, the hash key list, or hash chain, for the hash value CURRENT_HASH consists of the list 7, 3, 1.

Due to the fact that each section is associated with a particular HEAD table 711 and CHAIN table 712 through the HEADS array 701 and the CHAINS array 702 respectively, the hash key list is restricted from growing too long as each section only refers to a subset of the data in the history buffer. This also restricts the number of strings that has to be compared in an attempt to find a match. The HEAD table 711 and CHAIN table 712 under consideration only contain the hash key list for the pixels in vertical proximity to the pixel position associated with the data currently being encoded. Furthermore, the encoding of the distance to the matching string can be better optimized as it is the distance within the section that has to be encoded, and not the distance in raster scanline order, as is the case with prior art LZ77 based compression algorithms. It is noted that a high resolution image typically consists of several thousand pixels per row, which is significantly greater than the width of each section, which is 64 pixels in the preferred implementation.

The size of each HEAD table 711 is determined by the maximum value of the CURRENT_HASH that is used as the index to the HEAD table 711. That size, which is $2^{HASH\_BIT}-1$, multiplied by the number of entries in the HEADS array 701, is the memory requirement of the algorithm 10 for keeping the hashes. Normally, the value of HASH_BIT is smaller than that of 1-dimensional variations of the LZ77 scheme, as the entries that the HEAD array refers to cover only a single section instead of the entire history buffer. The size of each CHAIN table 712 is determined by the maximum value of index-n which is the distance within the hash chain section. The memory requirement for the CHAIN table 712 would typically be the same as that of 1-dimensional LZ77 schemes. The fact that the sections overlap by half the width as shown on FIG. 6, dictates that there is twice the amount of hash chain information altogether. So overall, twice as much memory is needed as in case of an equivalent 1-dimensional LZ77 scheme.

Referring again to FIG. 1 where the schematic flow diagram of the image compression algorithm 10 according to an embodiment of the present invention is shown, containing steps with numeric parameters which hold for the preferred section width of 64 columns overlapped by 32 columns. The image compression algorithm 10 starts in step 100 where the current focus point is set to be the first pixel in the first row (thus initialising LINE and COLUMN to 0) and the lash value held in the variable CURRENT_HASH is initialized. This hash value is based on the string of N consecutive values starting at the current focus point and represents the hash value attributed to the string starting at the focus point. The value of N is a constant parameter typically set to be 3, 4 or 5, and it specifies the shortest length of the string that is searched for a match. The image compression algorithm 10 chooses the value N depending on the characteristics of the image and the hash function used. For example, if the image is heavily decimated by the halftoning process and contains lots of long runs of repeated data, a higher value for N is chosen. The current focus point within the input data stream is at location $$[LINE*width+COLUMN] \tag{1}$$

in raster order and is stored in variable CURRENT_PIX, where variables LINE and COLUMN represent the row and column values of the current focus point, and the constant width designates the width of the image in pixels. The hash value represents the value of the N values coded on HASH_BIT bits that is the direct index to the hash chain table. Only the H−1 pixels from the current focus point and including the current focus point in scanline order are hashed in step 100. The hash value will be updated for the remaining Nth point in step 105.

The image compression algorithm 10 then proceeds to step 102 where the predetermined spatial relationships between the focus point and the positions of the reference points are adjusted to their optimum positions. The adjustment is preferably determined in step 102 based upon a statistical probability of finding a string of consecutive pixels starting from the adjusted reference points that matches a string of consecutive pixels starting at the focus point. Step 102 is performed at the start of the processing of each row of the input image, and is described in more detail with reference to FIG. 4.

The image compression algorithm 10 then proceeds to step 105 where the value of a current hash, stored as value CURRENT_HASH, is updated based on the last (Nth) of the pixels that form the N-length string starting at the current focus point.

The function used in steps 100 and 105 to transform the value of the next N pixels into a unique hash value CURRENT_HASH has to both be fast and provide a uniform distribution of random string values into the range [0 . . . 2^HASH_BIT−1]. Those skilled in the art will recognize known methods to achieve such a uniform distribution, for example by shifting the previous hash value CURRENT_HASH by a specified number of bits and collating the resultant value with the input data by an OR operation. The updated hash value is again stored in variable CURRENT_HASH. Also the criterion of a "good match" is set up by initializing in step 105 a value GOOD_MATCH. This criterion is used later in steps 120 and 130 as the parameter controlling the time performance tradeoffs of the compression algorithm 10. The value of the variable GOOD_MATCH may be set as an integer in the range from 1 to the length of the history buffer.

Step 110 then splits the history buffer into segments corresponding to sections, and adds the updated hash value CURRENT_HASH to the hash chains associated with the two sections in vertical proximity to the current focus point. Referring to the focus point 600 illustrated in FIG. 6, the two sections in vertical proximity to the focus point 600 are sections 620 and 630. Step 110 is described in more detail with reference to FIG. 2A where a schematic flow diagram of step 110 is shown.

Figure 2A:
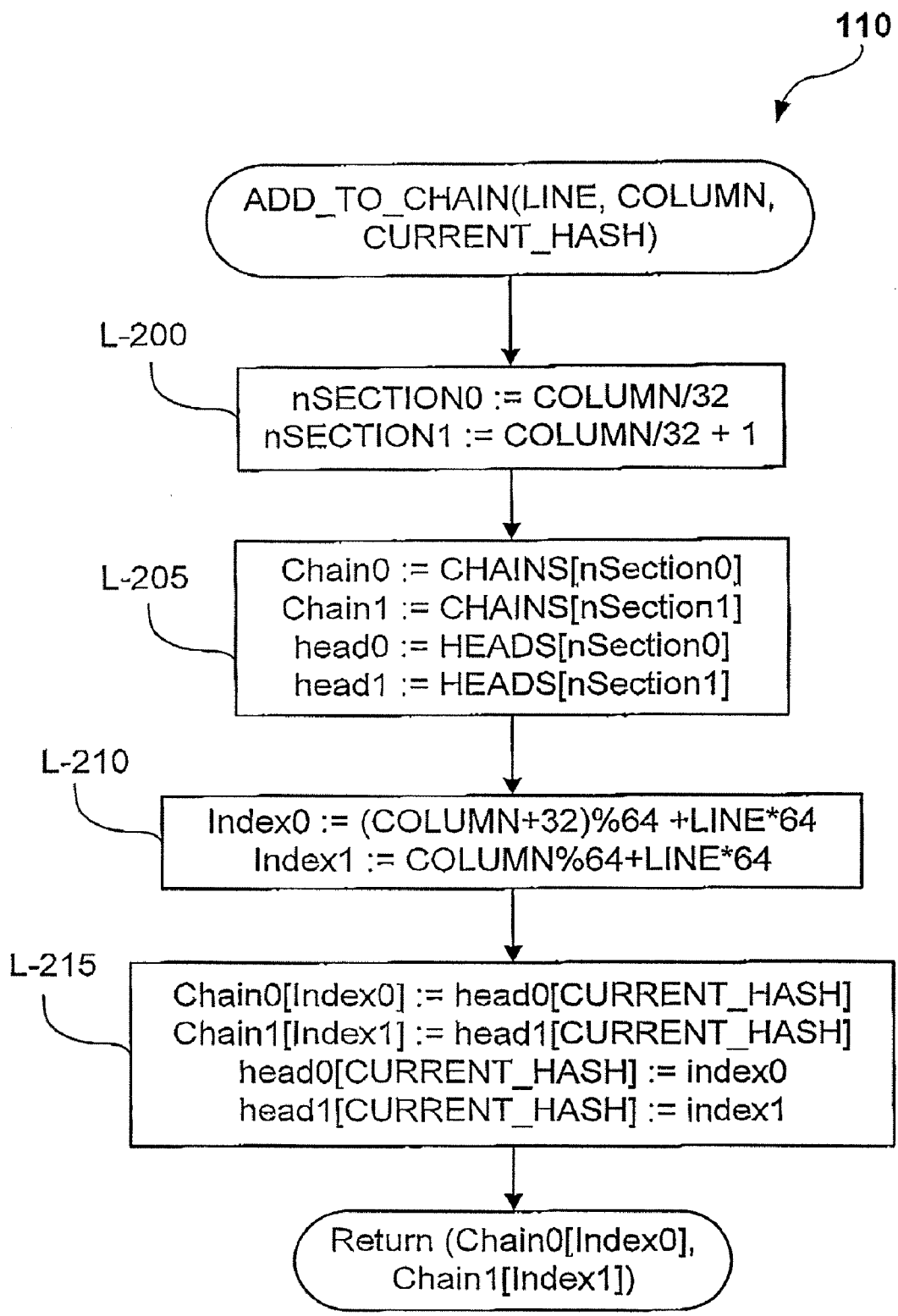
FIGS. 2A to 2C, 3, 4 and 5A to 5C show schematic flow diagrams of sub-steps occurring within the image compression algorithm shown in FIG. 1.

Referring to FIG. 2A, step 110 starts in sub-step 200 where the two sections that are in closest vertical proximity to the current focus point are identified. This is done on the basis of the column in the input image of the current focus point.

In sub-step 205 the CHAIN and HEAD tables associated with the two sections identified in sub-step 200 are identified using the equations shown.

Next, in sub-step 210 the indices of the current focus point within the corresponding hash sections are calculated using the equations shown. Sub-step 215 then adds the indices calculated in sub-step 210 into the head of the two hash chains. This involves looking up the entry in the HEAD table pointed to by the hash value CURRENT_HASH. It is noted that the previous heads of the two hash chains, that have been stored in HEAD0[CURRENT_HASH] and HEAD1[CURRENT_HASH] respectively before the execution of sub-step 215, move to the second position within the respective hash chains, and are stored in CHAIN0 and CHAIN1 arrays respectively. That action, if repeated for the same value of CURRENT_HASH over several indices, results in a formation of simple linked list of the indices associated with the same hash value CURRENT_HASH, with the most recently entered index at its head, and stored in HEAD0 and HEAD1 tables, while the rest of the list is stored in the CHAIN0 and CHAIN1 tables.

After completion of sub-step 215, after which step 110 ends, the image compression algorithm 10 proceeds to step 115 (FIG. 1) where a search is performed of all the strings starting at the reference points for a string that matches the string starting at the current focus point. Step 115, which is described in more detail with reference to FIG. 3, attempts to find one matching string that satisfies the criterion of a "good match". The criteria of a "good match" does not necessarily mean the matching string is the longest string from the strings starting at the respective reference points, but merely means that the matching string, if found, is long enough so as to provide a reasonably short code when emitted to the output stream, and therefore allows the search for that matching string to be terminated within a reasonably short time.

The image compression algorithm 10 next, in step 120, determines whether a string has been found which meets the criteria of a "good match". In the present case a test is performed to determine whether the matching string that has been found is longer than a given length specified through the value of GOOD_MATCH. The value of GOOD_MATCH is also used in the sub-steps of step 115 where the search is performed for a matching string starting at the respective reference points. The value of GOOD_MATCH not only determines the minimum length of the matching string, but also determines the amount of time step 115 spends searching for a match. Accordingly, by setting the value of GOOD_MATCH a compromise is made between compression speed and efficiency.

If it is determined in step 120 that a good match has been found in step 115, then control in the algorithm 10 continues to step 145 where the encoding of the string that matches the string starting at one of the reference points takes place. Step 145 is described in more detail below with reference to FIG. 5A.

Figure 2B:
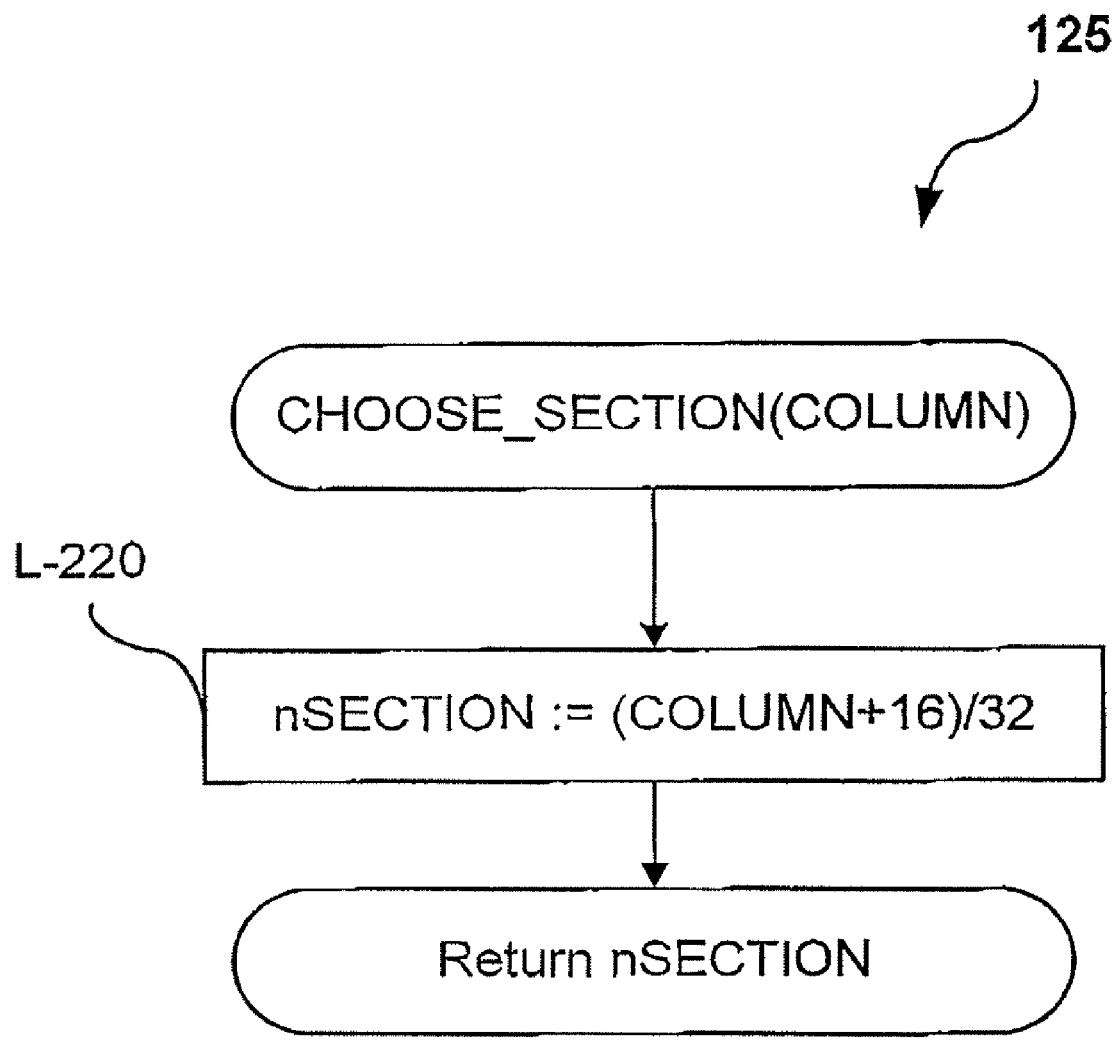

Alternatively, if it is determined in step 120 that a good match has not been found, then the algorithm 10 continues to step 122, where the value of GOOD_MATCH is reset again to a constant value as in step 105. Steps 125 and 130 follow, where a search is performed for a better match in the section in vertical proximity to the current focus point. Such a match is referred to as the "hashed match". Step 125 is described in more detail with reference to FIG. 2B where a schematic flow diagram of step 125 is shown. Referring to FIG. 2B, step 125 comprises sub-step 220 where the section in closest vertical proximity to the current focus point is identified using the equation shown, which holds for the preferred section dimensions. In particular, the section for which the current focus point is closest to the centre of the span is identified as the section in closest vertical proximity to the current focus point. Referring to the example in FIG. 6, the section identified in step 125 for focus point 600 is section 620.

The compression algorithm 10 then continues to step 130 (FIG. 1) where the data within the section identified in step 125 is examined in an attempt to find matching strings. The section identified in step 125 is assigned the variable CURRENT_SECTION. Step 130 searches the hash chain within the CHAIN table associated with the variable CURRENT_SECTION and starting with the pointer CURRENT_HASH. In particular, that hash chain is searched sequentially until either a good match is found, or the hash chain is exhausted.

Figure 2C:
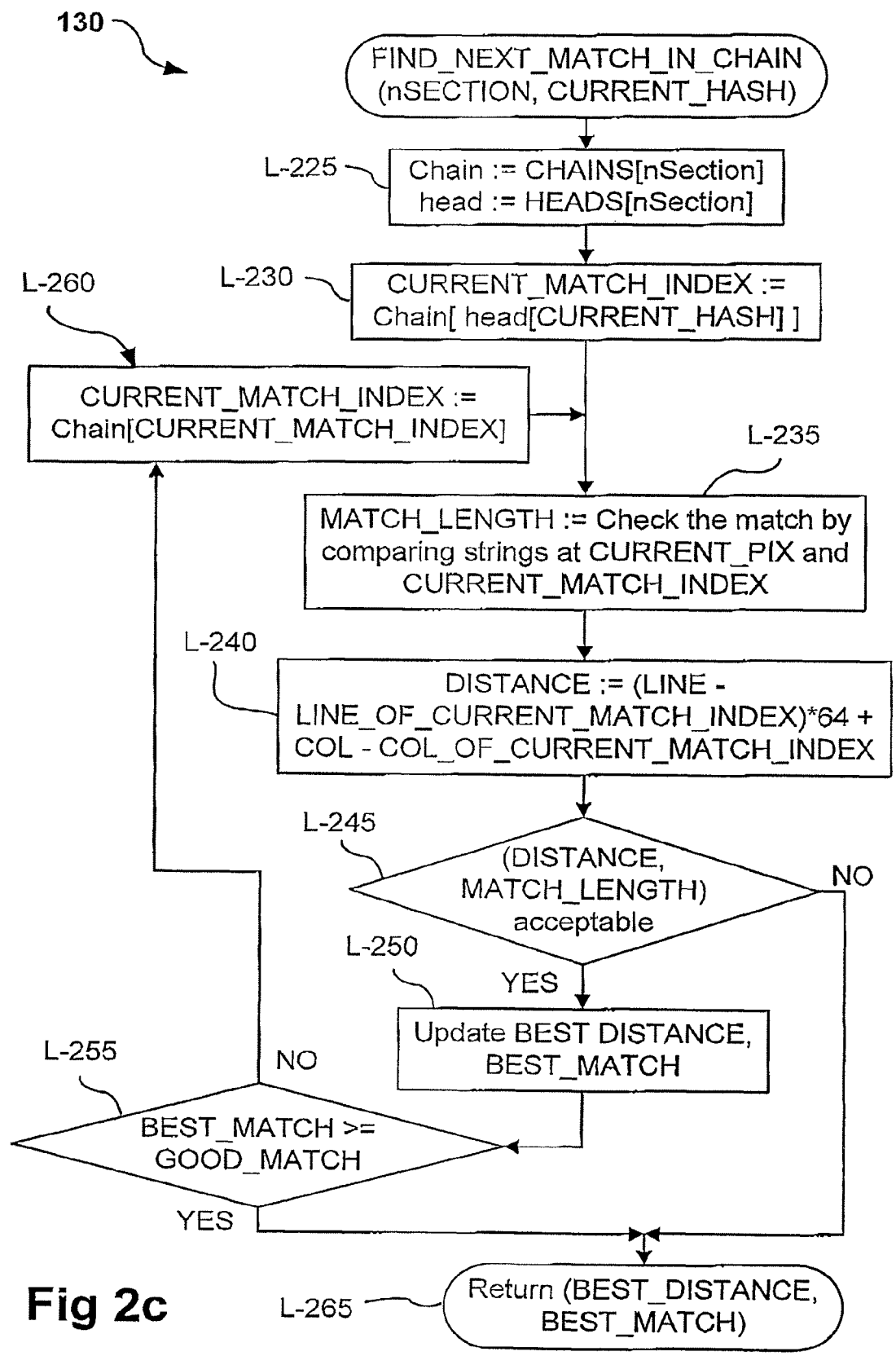

FIG. 2C shows a schematic flow diagram of step 130. Step 130 starts in sub-step 225 where the CHAIN table and HEAD table associated with the section identified in step 125 are identified. Sub-step 230 then picks the index of the second match for the value CURRENT_HASH from the associated CHAIN table. It should be noted that the first matching index HEAD[CURRENT_HASH] is skipped as it is the index that has just been added during step 110 and it is the index of the current focus point itself. Sub-step 235 then calculates the length of the match identified in the preceding sub-step by comparing the string starting at the index of that match and the string starting at the current focus point. Note that the matched string starting at the index of the match may contain one or more pixels outside the current section, so the matched length may be greater than the section size.

Next, in sub-step 240, the compression algorithm 10 calculates the distance within the current section of the current match index from the current focus point using the equation shown, and in sub-step 245 the algorithm 10 determines whether the combination of the distance and the length of the current match is acceptable. As an example, the criteria used in sub-step 245 may include: that the distance does not exceed 4000 pixels, which is the maximum distance that produces output code short enough; or that the entry in the hash chain is not too old in that the entry is not further than a predetermined number of entries from the start of the hash chain. In the preferred implementation the entry should not be further than 256 entries from the start of the hash chain.

If it is determined in sub-step 245 that the combination of distance and length is unacceptable, then all further matches would also be unacceptable. Accordingly, step 130 terminates in sub-step 265, returning the distance and length particulars of the best match. It could be the case that no match has been found that meets the criteria of sub-step 245, in which case the variables storing the best match length and distance particulars have a return value of zero.

If it is determined in sub-step 245 that the combination of distance and length is acceptable then, in sub-step 250 the variables BEST_DISTANCE and BEST_MATCH are updated with the distance and length particulars of the current match. Following the updating of the variables BEST_DISTANCE and BEST_MATCH, in sub-step 255 it is determined whether the length of the present match is greater than or equal to the value of GOOD_MATCH. In the case where the determination of sub-step 255 is in the affirmative then step 130 also terminates, returning the distance and length particulars of the best match. It is noted that the current match may not be the best match overall, but that match is deemed to be acceptable and step 130 is terminated in order to improve the timing performance of the algorithm 10 at the expense of potentially finding a better match later in the hash chain.

If it is determined in sub-step 255 that the present match is not acceptable then, in sub-step 260 the next match is retrieved from the hash chain before step 130 returns to sub-step 235 where the length of the next match is determined.

Referring again to FIG. 1, the compression algorithm 10 continues in step 135 where a determination is made whether the length and distance particulars returned from steps 130 and 115 are both zero, which indicates that no acceptable match has been found. In the case where no acceptable match has been found the data from the current focus point is literally encoded in step 155 before the focus point is advanced to the next column in step 165. The literal encoding occurring in step 155 is described in more detail with reference to FIG. 5C. Step 165 then increments the variable COLUMN by one.

Following step 165 it is determined in step 175 whether the end of the present row has been passed. If more pixels in the present row exist, then the compression algorithm 10 returns to step 110 from where the next pixel is designated the current focus point and encoded. If the end of the present row has been reached then processing advances to the next row by incrementing the variable LINE and resetting the column counter in step 185 before a determination is made in step 190 whether the last row of the image has already been processed.

If more rows exist in the image that have not been encoded then processing in algorithm 10 returns to step 102. In the case where step 190 determines that all the pixels of the image have been encoded, step 195 encodes an End of Block (EOB) symbol before the compression algorithm 10 ends.

In an alternative embodiment, the image may be split into bands in which case step 190 determines whether the end of the pixels in the band has been reached. Step 190 may also be set to determine whether the end of a halftoned plane has been reached, with a next plane having different dither pattern characteristics requiring repositioning of the reference points to achieve better compression. The determination in step 190 may also be made at runtime, for example by monitoring the compression, examining the hash table fill, etc. In any of the above cases the algorithm 10 is eventually ended, which causes step 195 to encode the EOB marker.

Returning to step 135, if it is determined that an acceptable match has been found in step 130 or step 115 then, in step 140, it is determined whether the hashed match found in step 130 is better than the reference match found, if any, in step 115. This determination generally depends on statistical characteristics of the encoded data and the compression parameters chosen. As an example, it may be that the length of the hashed match must be at least 4 pixels longer than the length of the reference match before the hashed match is deemed a better match with regards to the length of the output data needed to encode that match.

In the case where the reference match is determined to be the better match the algorithm 10 proceeds to step 145 where that match is encoded.

Alternatively, if it is determined that the hashed match is the better match then the algorithm 10 continues to step 150 where the distance and length of the hashed match are encoded. Step 150 is described in more detail with reference to FIG. 5B.

Following either step 145 or 150 the algorithm 10 continues to step 160 where an optional update of the hash chains associated with the two sections in vertical proximity to the current focus point is performed. Step 160 consists of an (n−1)-time iteration of the steps 105 and 110 for the (n−1) pixel values following the current focus point, where n is the length of the matching string just encoded. The update of the hash chains is performed so that when subsequent pixels come in focus the pixels following the current focus point are also considered when searching for a match. In the case where step 160 is omitted, or only performed for a sub-set of the pixels following the current focus point, the values for omitted pixels won't be included in the respective hash chains, and a potential match with subsequent strings starting at future focus points will not be detected should such exist.

Step 170 follows where the current focus point is advanced by an amount of pixels equal to the length of the match. The algorithm then proceeds to step 175 from where the next pixels are processed as described above.

Figure 3:
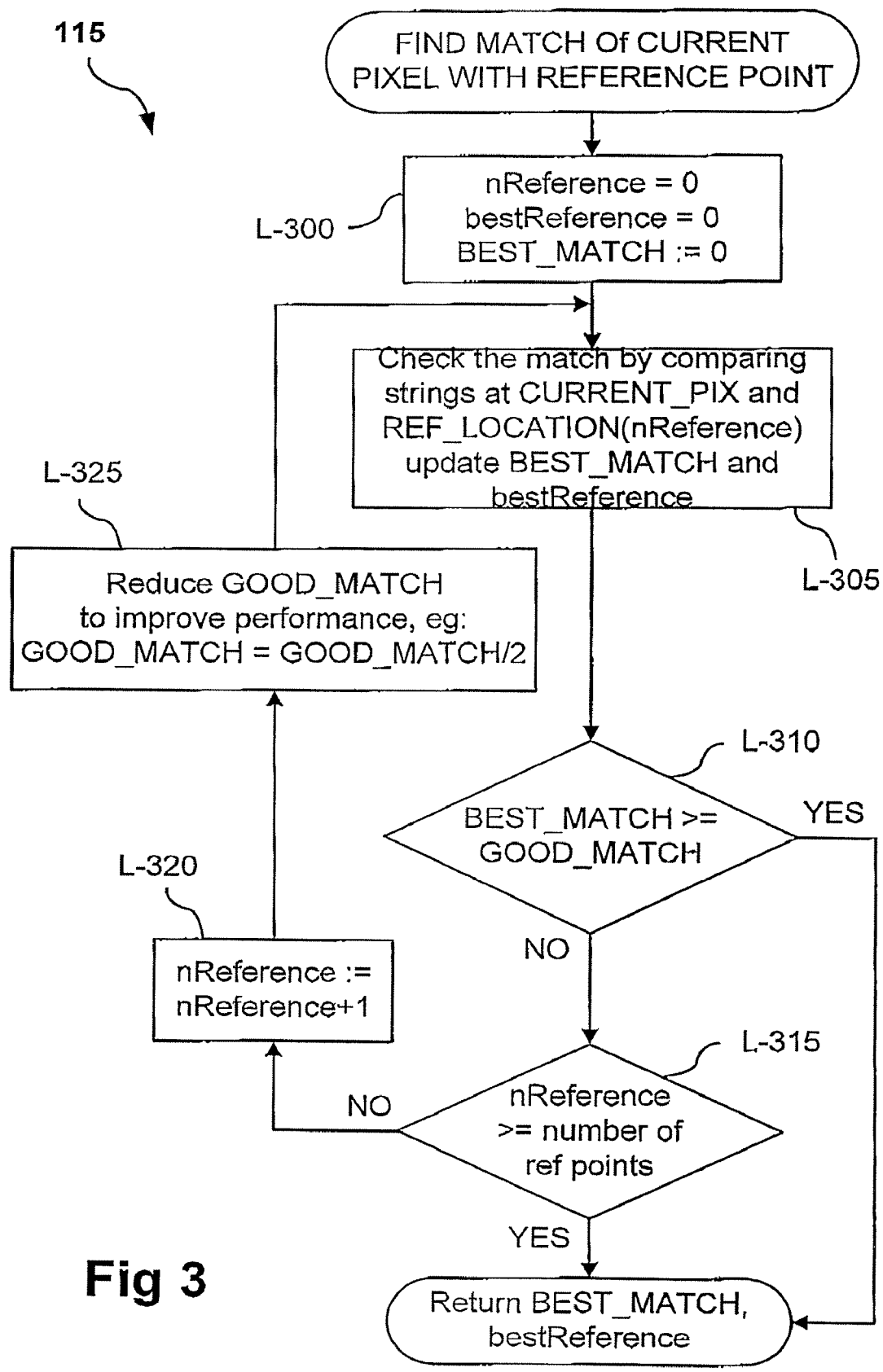

Step 115, where the search is performed of all the strings starting at the reference points for a string that matches the string starting at the current focus point, is now described in more detail with reference to FIG. 3. Step 115 starts in sub-step 300 where a variable BEST_MATCH is initialised to be zero. Also in sub-step 300 a variable bestReference is initialised to be zero, and variable nReference, indicating the current reference point index, is initialized to 0. Next, in sub-step 305 it is determined whether the string at reference point indexed by nReference matches the string starting from the current focus point. The length of the matching string is recorded to variable BEST_MATCH, and nReference assigned to bestReference, if that length is greater than a previously recorded length.

A determination is then made in sub-step 310 whether the length recorded in the variable BEST_MATCH is greater than the variable GOOD_MATCH. The purpose of the variable GOOD_MATCH was described above with reference to step 120. If it is determined that the length recorded in the variable BEST_MATCH is greater than or equal to variable GOOD_MATCH, then step 115 terminates, returning the present values of the variables BEST_MATCH and bestReference. It is noted that step 115 terminates when a match is found which meets the criteria of sub-step 310. This may not be the longest match, but as that match is deemed adequate, step 115 terminates in the interest of time performance.

If it is determined in sub-step 310 that the length recorded in the variable BEST_MATCH is not greater than or equal to GOOD_MATCH, then the step 115 continues to search the other reference points for a good match. This is done by proceeding to sub-step 315 where it is first determined whether more reference points exist. If all the reference points have already been tested for a good match without finding the same, then the step 115 also returns.

However, if more reference points remain then step 115 proceeds to sub-step 320 where the variable nReference is incremented, thereby pointing to the next reference point. The value of the variable GOOD_MATCH is also reduced in sub-step 325 in order to improve performance, that is reducing the criteria for a good match which makes it easier to find an acceptable match. In the preferred implementation the value of the variable GOOD_MATCH is halved. It is however noted that even though the criteria for a good match have been relaxed, it is the best match that is returned by step 115, and not necessarily the last reference point tested.

The string starting at the next reference point is then tested from sub-step 305 to determine whether that string matches the string starting from the current focus point.

Figure 4:
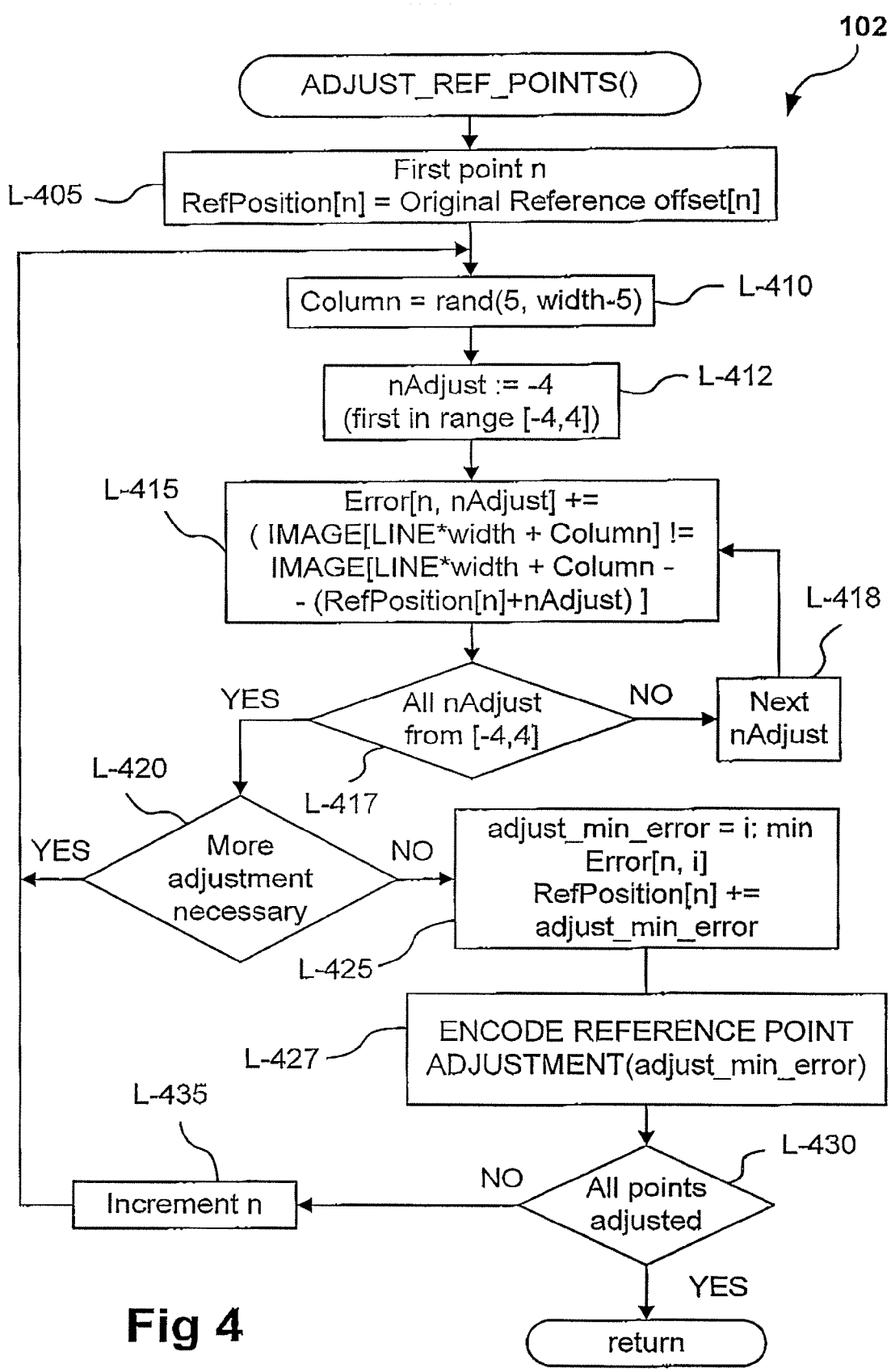

Having described the search of the strings starting at the reference points for a string that matches the string starting at the current focus point, the manner in which the predetermined spatial relationships between the focus point and the positions of the reference points are adjusted, performed in step 102, is now described in detail with reference to FIG. 4. As mentioned above, step 102 is performed at the start of the processing of each row of the input image.

Step 102 starts in sub-step 405 where the first of the reference points is selected, and the variable n is assigned to index that current reference point. An array RefPosition is used to store the respective distances, in raster order, of the reference points from the current focus point. For example, the reference point 613 on FIG. 6 is located 4 scanlines up and 1 pixel left from the focus point 600. The value of array RefPosition for the reference point 613 is 4*width+1, where width is the length of the image scanline in pixels. The array RefPosition is initialised to the original predetermined distance values that define the basic spatial relationship between the reference points and the focus point.

In sub-step 410 that follows a column of the image is chosen at random, excluding the predetermined set of boundary columns so that the adjustment process does not include the pixels outside the boundary of the image. A first adjustment index, stored in variable nAdjust, is set in step 412 to the first index from a given range of adjustment indices, with the range preferably being set to [−4, 4].

Next, in sub-step 415 a current entry in a table Error of Boolean errors (indexed by the current reference point and the current adjustment value) is calculated as the difference between the image values at the focus point and the current reference position adjusted left or right by nAdjust pixels. An array value IMAGE[LINE*width+Column] represents the value of the pixel in the input image at the focus point, with the position of the focus point being defined by the present row and the column counter. Similarly, an array value IMAGE[LINE*width+Column−(RefPosition[n]+nAdjust)] represents the value of the pixel at the current reference point n adjusted by nAdjust pixel positions.

In sub-step 417 it is then determined whether the present adjustment index nAdjust is the last from the given range of adjustment indices. If more adjustment indices remain, then the index nAdjust is set to the next adjustment index from the given range of adjustment indices in sub-step 418 before sub-step 415 is repeated for that next index nAdjust. The values in the table of Boolean errors calculated in sub-step 415 is cumulative in that errors calculated for different adjustment indices nAdjust, or further columns, are added to the existing errors.

After Boolean errors have been calculated for all of the adjustment indices nAdjust, the step 102 continues to sub-step 420 where it is determined whether more error calculations are necessary. The determination in sub-step 420 may be as simple as a fixed loop counter check, or include a more sophisticated condition based on the distribution of the errors in the table of Boolean errors. As an alternative, or additionally, sub-step 420 may determine that no more error calculations are needed when the distribution of the errors in the Boolean error table does not change for the last several iterations. If more error calculations are needed then the step 100 returns to sub-step 410 where a next column is selected in a random manner.

Usually the error values over a small sample of the total number of columns give an accurate approximation of the optimal adjustment of the reference point presently under consideration. A sample of approximately 1% is generally sufficient. Accordingly, an exhaustive comparison is nor necessary. It is therefore generally sufficient for sub-step 420 to merely determine whether a predetermined number of columns in the present row have been considered.

If it is determined in sub-step 420 that no more error calculations are needed then, in sub-step 425 the smallest error from the current row of the table of Boolean errors is found. The adjustment index associated with that smallest error indicates the best adjustment of the current reference point. The adjustment index nAdjust of the adjustment with the smallest error found is added to the distance to the reference point, which is stored in RefPosition[n]. Accordingly, the relative distance of the current reference point n is moved within the range [−4, 4] of the original reference position. The value of nAdjust is also encoded into the output stream in the sub-step 427, which follows. As the adjustment is a small number (typically in the range [−4, 4]), the coding efficiency of encoding the adjustment is high in that a small number of bits is required to encode the adjustment index nAdjust. Typically the contribution to the length of the output stream for a given row is less than 0.01%. The symbols used in encoding of the index nAdjust providing the minimum error performed in sub-step 427 can be shared between other codes in the output stream and does not require dedicated symbols, because the position of adjustment encodings are well defined in the output stream if the image width parameter is known to the decoder.

Following sub-step 427 it is determined in step 430 whether all the reference points have been adjusted. If reference points remain, the index n for the reference points is incremented in sub-step 435 before sub-steps 412 to 425 adjust the relative position of that next reference point.

Once all the relative positions of the reference points have been adjusted, step 102 returns. Sub-step 430 may alternatively be changed such that only a certain number of the reference points are adjusted before step 102 returns. It may be the case that a decision is made beforehand that certain reference points are not adjustable.

As can be seen from the above explanation, the aim of step 102 is to adjust each of the positions of the predetermined reference points relative to the focus point based on the error between the pixel value of the focus point and the pixel value at the adjusted reference point as determined at random column positions in the present row. The adjusted reference points have a greater statistical probability of matching a greatest number of focus points in the present row.

Referring again to FIG. 6, the shaded areas within the same row as, but around each of the reference points 610, 611, 612, and 613, indicate the possible adjustments made to the respective reference points 610, 611, 612, and 613. It is noted that the preferred range of adjustment is [−4, 4], whereas the indicated range is [−2, 2] for illustrative purposes only.

Due to the spatial relationship between the current focus point and reference points the situation would occur, especially when the current focus point is close to an edge of an image, that the spatial relationship dictates that the reference point is outside the image. Also, it may be that a reference point close to the edge of the image would be outside the image after adjustment. There are various ways to deal with this situation. In one implementation the reference point is moved in scan raster order, which may result in the reference point being wrapped around to a position on the opposite side of the image to that of the current focus point. In another implementation all reference points outside the image are ignored during searching for matches.

The encoding of the pixels is now described in more detail. By merely substituting the repeated sequences of pixel data with symbols representing the distance and match lengths, the resulting stream of symbols (output stream) still exhibits a significant statistical redundancy, meaning that some symbols occur far more often than the others in the output stream. By adapting an optimal code-length for each symbol, based upon the statistical frequency of the respective symbols, the overall sum of the symbol lengths after encoding may be reduced. Accordingly, the stochastic redundancy in the output stream is reduced.

The encoding may be fixed or dynamic statistical encoding, or alternatively prefix-based encoding. The compression algorithm 10 applies an efficient and fast statistical encoder which uses a highly adaptable probability model. This allows the compression algorithm to achieve an encoding that is close to optimal. In particular, a range coder is used as the encoder to achieve a good compromise between efficiency and speed.

Range coding is a variation of arithmetic coding, which works with probabilities of the symbols in the interval between 0-1. The probabilities are subdivided, based on the cumulative probability of the symbol which is currently being processed. Due to the fact that a finite number representation is used, the most significant bits of the output symbols are output, and the rest of the interval is shifted left in order for the encoder to keep working on the least significant bits of the interval. Otherwise, the interval would quickly become 0. That process is called renormalization.

A typical arithmetic encoder outputs the most significant bit as soon as the bit becomes determined. In contrast, the range coder performs the renormalization only when the most significant byte is determined and shifts the interval by 8 bits. That results in a slightly less efficient use of the interval, and the compression ratio drops by 0.01% compared to typical arithmetic encoders. Such a drop in compression ratio is not very significant, especially in light of the gain achieved through the shorter computation time on most of today's computers. Also, due to the output of the range coder being processed in bytes instead of bits, and the renormalization operation being performed fewer times, the range coder is a very good choice for arithmetic coding.

In a typical LZ77 scheme, when no matching string is found, the data of the current pixel is literally encoded, which results in a relatively long code when compared to the length of the data of the pixel. By applying a move-to-front (MTF) model to the literal symbol encoding, the present compression algorithm 10 shortens the output codes for the literals that can be grouped together, as is often the case when pixels are read in scan-line raster order.

The quasi-static frequency model used by the preferred range coder offers a compromise between speed and efficiency of maintaining probabilities associated with various strings of data. The quasi-static frequency model performs well with small to medium string lengths, which are strings of data of between 200-300 symbols. Also, the quasi-static frequency model is fairly flexible in that it is able to update itself relatively quickly to changing probabilities of the input strings of data.

A range coder, like other arithmetic coders, allows mixing of different frequency models for subsets of symbols. That property allows sets of symbols with different stochastic distributions to be encoded into the single output stream of data. Algorithm 10 outputs several classes of symbols: reference point adjustments, reference point number, match length, match distance, literal symbol, and finally Move-to-Front (MTF) cache index of the literal symbol in the MTF cache. (The MTF cache is a fixed length FIFO structure). By grouping the symbols into several groups and assigning each group its own frequency model, and encoding them together with the frequency model updated for each group independently, the algorithm 10 takes full advantage of this property of the range coder. It can be assured that the process of compression stays as a single pass while having optimal statistical encoding for each type of symbols.

According to the preferred implementation, the symbols are divided into the following categories:
RefPoint Adjustments
Match lengths from 1 to 16
Match lengths exponential Golomb prefixes for matches length above 16
Match length exponential Golomb suffixes for matches length above 16
Match Distances
Literals
MTF cache indices
These are combined into 6 groups of symbols:
Group 1: RefPoint Adjustment values. These are values in the range [−4, 4], resulting in 9 symbols, encoded as a flat distribution on 4 bits.
Group 2: MTF indices. As MTF cache buffer is 16 entries long, there are 16 symbols encoded as a flat distribution on 4 bits.
Group 3: Literals. There are 256 of those, as one byte is the literal. They are encoded according to their own quasi-static code model.
Group 4: Match distances. Ranging in value from 1 to some MAX_DISTANCE, they are encoded according to their own quasi-static code model.
Group 5: containing several subgroups namely:
5.1 Match lengths 1..16 for each of the reference point and hash chain matches
5.2 Golomb code prefixes for match lengths more than 16 for each of the reference point and hash chain matches
5.3 marker for literal symbol entry
5.4 marker for MTF symbol entry.
If MAX_MATCH_LENGTH value is assumed, that results in g Golomb code prefixes, then the total number of symbols in group 5 will be:

TOTAL_SYMBOLS=(16+g)*(nReferences+1)+2, where nReferences is the number of reference points. nReferences+1 denotes that match lengths also come from hash chain matches. The extra 2 symbols are literal and MTF markers. Those symbols are encoded according to their own quasi-static code model.
Group 6: Golomb code suffixes. They are encoded as a flat distribution on a number of bits appropriate to each specific code.

Figure 5A:
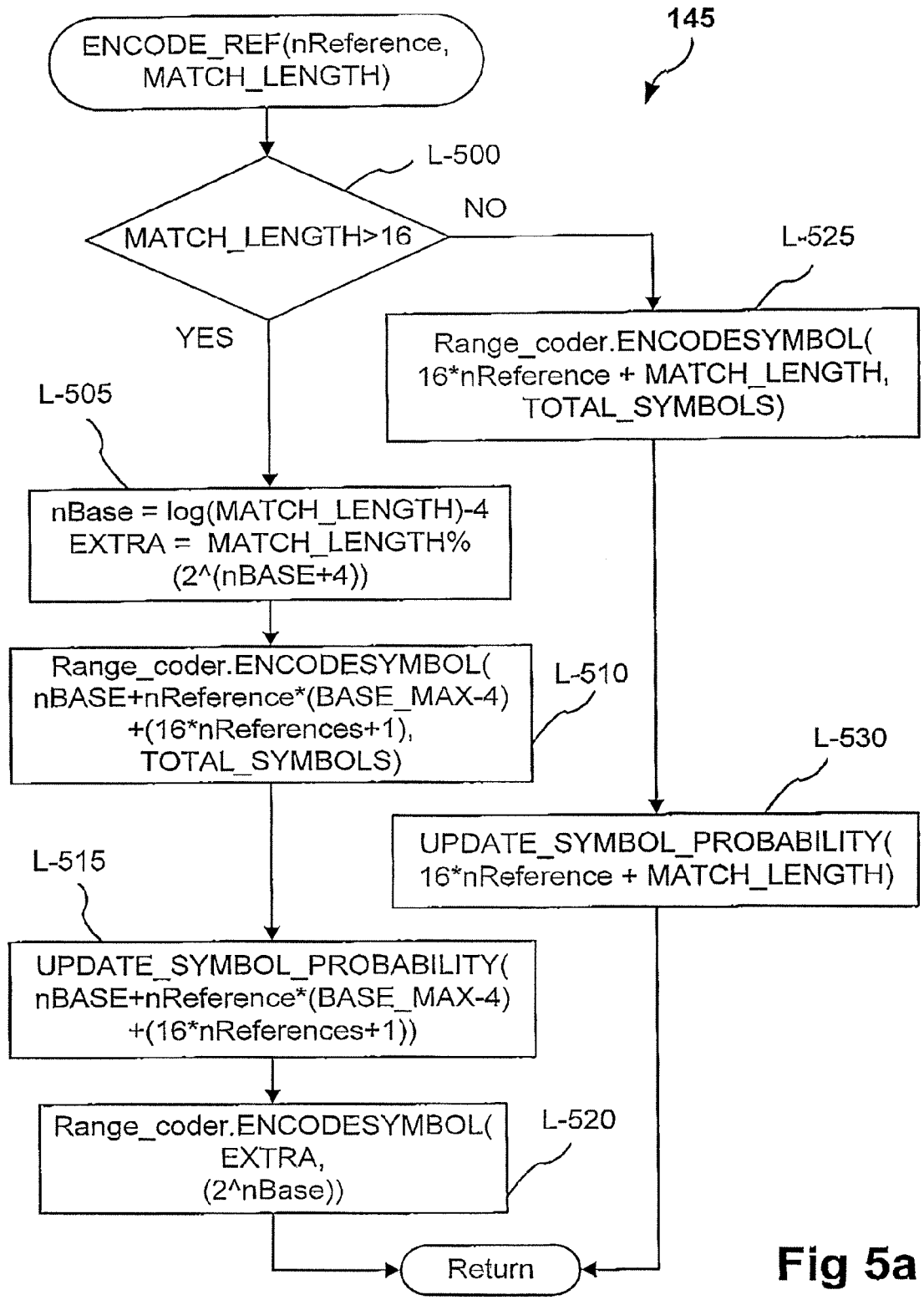

Step 145 where the encoding of the string that matches the string starting at one of the reference points takes place is now described in more detail with reference to FIG. 5A. Step 115 returns the length of the matching string as the variable MATCH_LENGTH, and the identifier of the reference point at which the matching string was found as the variable nReference where nReference can be a value from 0 to the number of reference points. Sub-step 500 determines whether a symbol from sub-groups 5.1 or 5.2 will be encoded. If the matching length is no more than 16, then sub-step 525 is executed. The value of 16*nReference+MATCH_LENGTH is passed as the first parameter to the ENCODESYMBOL method of the range coder. This value indicates the symbol number. With nReference ranging from 0 to nReferences−1 and MATCH_LENGTH from 1 to 16, it can be seen that symbol ordinals are 1..(16*nReferences+1). The second parameter is the total number of symbols in group 5, to which the symbol encoded by sub-step 525 belongs. Next, in sub-step 530, the updating of a the symbol probability within group 5 of symbols is performed before step 145 returns. Matching string lengths of 16 or less are the most frequently occurring match lengths. As a result of encoding those matches in step 525, each length value is assigned a separate symbol on one by one basis to ensure most accurate encoding.

Matching string lengths longer than 16 are assigned the exponential Golomb codes in sub-step 505. According to that coding scheme, values that can be represented by the same number of binary digits or that have the same logarithmic length, are assigned equal implicit probability. So, the value of the variable MATCH_LENGTH is split by sub-step 505 into:

$$nBASE=\log_2(MATCH\_LENGTH)-4, \text{ and} \quad (2)$$

$$EXTRA=MATCH\_LENGTH \%(2^{(nBASE+4)}). \quad (3)$$

It should be noted, that $\log_2(MATCH\_LENGTH)$ is adjusted by 4 so that nBase starts from 0 whereas MATCH_LENGTH starts from 16.

In order to establish the number for the symbols to be used by the range coder, the upper limit for nBASE, with the upper limit being a constant BASE_MAX, must be imposed. The matching string length values in the range [17 ... 2^BASE_MAX] are then grouped into BASE_MAX−4 groups. BASE_MAX is chosen so that 2^BASE_MAX is no less than the maximum length that can be encoded. It could be for example one scanline length. The value of nBASE plus the value of nReference indicating the reference point index is encoded as an ordinal expression:

$$nBASE+nReference*(BASE\_MAX-4)+(16*nReferences+1) \quad (4)$$

in sub-step 510. It is noted that sub-step 510 uses a probability table relating to group 5. It is further noted that an offset (16*nReferences+1) is added because that many ordinals are allocated in group 5 by symbols encoded in step 525.

The probability of that symbol is updated in sub-step 515, as the symbol belongs to group 5, where the quasi-static probability is maintained. Sub-step 520 then encodes the value of a variable EXTRA. As in typical Golomb codes, the value of the variable EXTRA is encoded as a flat number using as many bits as required to represent that value, which is nBASE. No probability distribution needs to be maintained for the values of the variable EXTRA. Following sub-step 520 the step 145 returns.

Figure 5B:
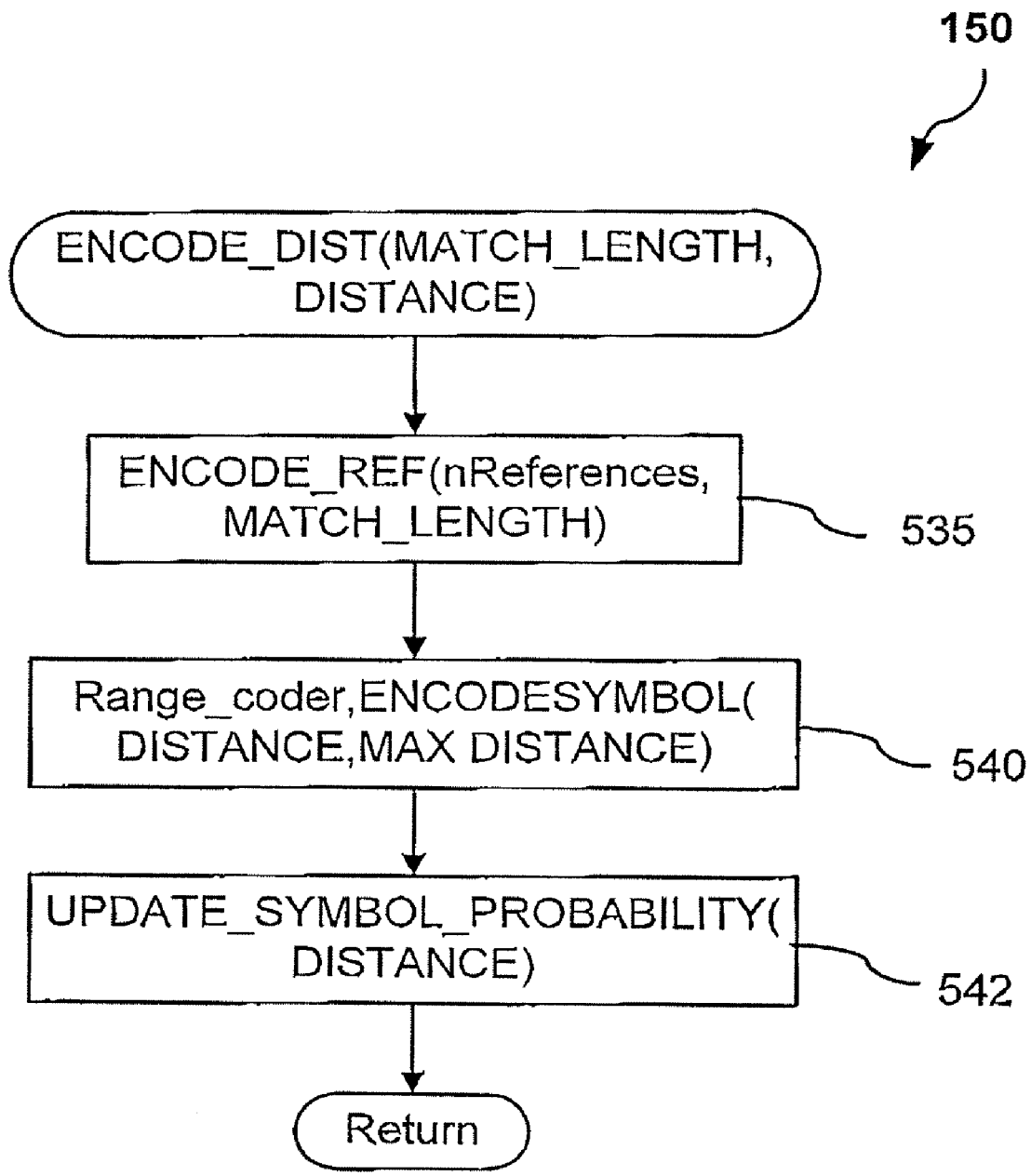

Next, step 150 where the encoding of the hashed matching string found in the searched section is now described in more detail with reference to FIG. 5B. The parameters used are those returned by step 130, which are the length of the matching string passed as MATCH_LENGTH, and the distance to the matching string passed as DISTANCE. The value of the variable MATCH_LENGTH is first encoded in sub-step 535. The process of encoding is identical to step 145, except that the reference point ordinal passed is equal to nReferences. So, from the point of view of the flow diagram shown in FIG. 5A, when its input parameter nReference is equal to nReferences it performs encoding of MATCH_LENGTH coming from the hash chain rather than the non-existent extra reference point. The required number of symbols are allocated in group 5 for this purpose and the symbol ordinal calculations described above reflect that.

Next, in sub-step 540, the variable DISTANCE is encoded. The encoding of the variable DISTANCE is preferably performed using a dynamic probability model. With that model, updating the symbol frequency must be made, as the symbol belongs to group 4, which is performed by sub-step 542. Alternatively, exponential Golomb codes designed similarly to those in step 145 may be used because the distribution of the distances is very close to the exponential. If the input halftoned image data exposes strict periodicity, as is the case when a fixed dither matrix is used, then it is more beneficial to prioritize the codes used for encoding the distances accordingly. For example, arbitrarily assigning a multiple of the dither offset, for example a multiple of 4, results in shorter codes.

Figure 5C:
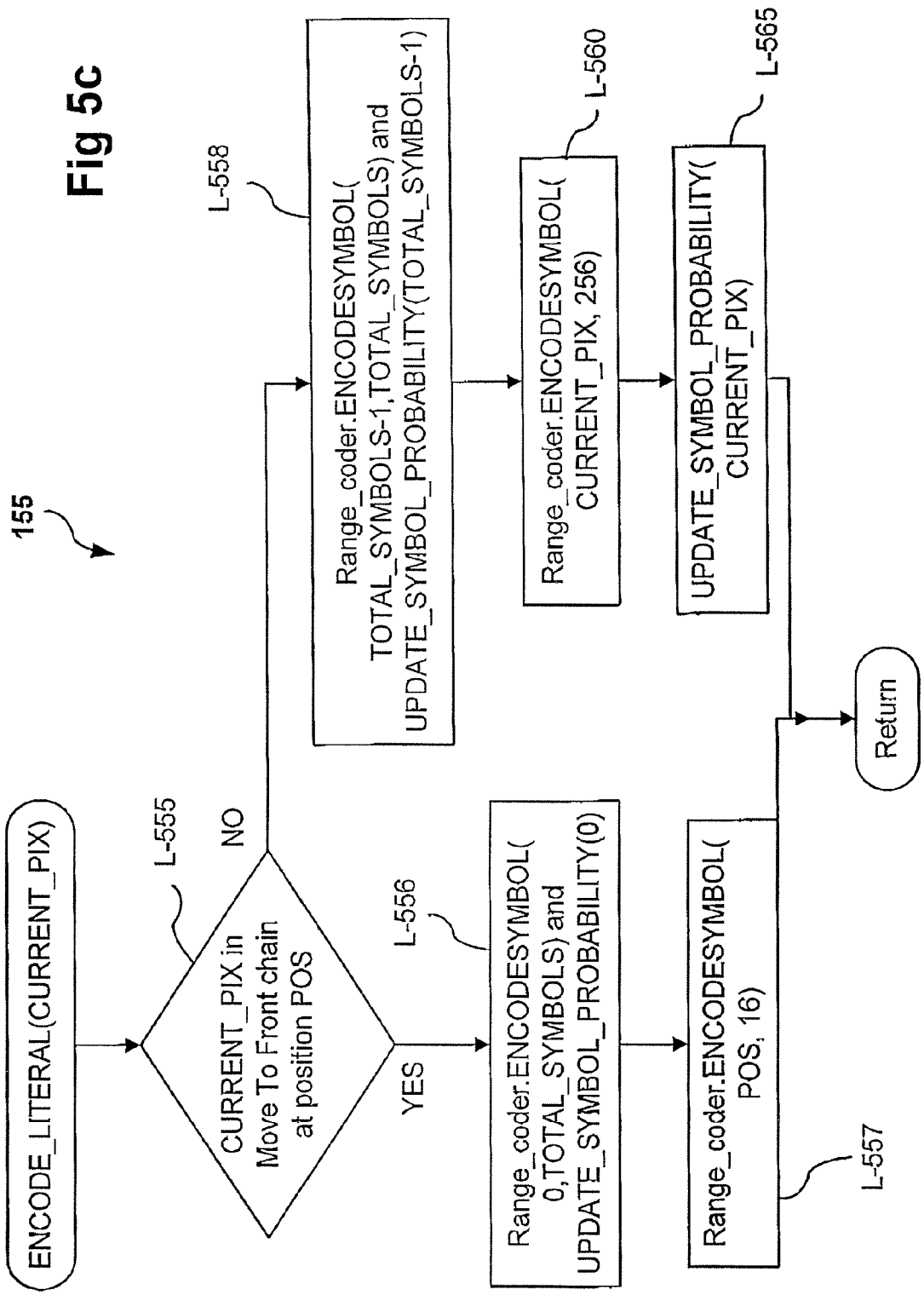

Referring next to step 155, which is described in detail with reference to FIG. 5C where the current focus point is literally encoded. The literal encoding of step 155 either encodes the data of the current focus point as a symbol LIT0 . . . LIT255, or as a Move to Front (MTF) cache index. The use of an MTF cache is well known in the art, and generally allows the shortening of code lengths instead of quasi-random symbols where identical symbols tend to group together. An MTF cache is used within the compression algorithm 10 because it is common in images halftoned with random dither patterns that sets of the same pixels are not patterned but are still grouped together.

Step 155 starts in sub-step 555 where it is determined whether the data of the current focus point is in the chain list stored in the MTF cache. If so, the MTF cache marker is encoded in the output stream as an ordinal symbol 0 in sub-step 556. Then, the MTF cache index is encoded in sub-step 557, which can be for example in the range [0 . . . 15] from the group 2 of 16 symbols.

If it is determined in sub-step 555 that the data of the current focus point is not in the MTF chain list then the literal code marker is issued to the output stream in sub-step 558. Sub-step 560 which follows, encodes the literal value passed which is treated as the symbol ordinal from the group 3 of 256 symbols. In sub-step 565 which follows sub-step 560 the probability of the symbol output by sub-step 560 is updated within group 3. Following either sub-step 550 or sub-step 565 the step 155 returns.

Having described all the steps and sub-steps of the compression algorithm 10, the decompression algorithm 20 is next described with reference to FIG. 8 where a schematic flow diagram of the decompression algorithm 20 is shown. The task of the decompression algorithm 20 is to read the encoded stream, and feed the encoded stream to a range decoder, which determines the type of symbol associated to the input bits. Depending on the type of symbol, either the literal symbol, the distance within the original hash chain, or the number of the reference point follows in the input stream.

The decompression algorithm 20 starts in step 800, which is executed at the start of each row, and where the values of the reference point adjustments are retrieved from the compressed stream. The adjustment values are used in later steps of the decompression algorithm 20 to determine the respective positions of the reference points relative to the current focus point. Step 805 follows where a next symbol from the range decoder is retrieved. The type of symbol is next determined in step 810.

In the case where it is determined in step 810 that a literal symbol has been received, step 815 determines whether the literal symbol is an MTF cache index or a true literal. If it is determined that the symbol is an MTF cache index, then step 825 copies the bytes from the MTF cache to the output of the decompression algorithm 20. Alternatively, if it is determined that the symbol is a true literal, then step 820 copies the literal bytes represented by the symbol to the output of the decompression algorithm 20. The literal value is also put at the front of MTF cache, which also causes the oldest value in the MTF cache to be thrown away.

In the case where it is determined in step 810 that the symbol represents a match with a reference point, control passes to step 830 where the variable MATCH_LENGTH is decoded from the symbol, as well as the extra bits encoded in sub-step 520 (FIG. 5A), which was the case when the variable MATCH_LENGTH exceeded the value 16. Step 830 also includes updating of the appropriate symbol probability in the same manner the symbol probability was updated in step 145 (FIG. 5A). Next, in step 835, the algorithm 20 determines the distance of the decoded reference point from the current focus point. The distance is determined by the number of the reference point that has been encoded in step 145 (FIG. 5A), adjusted by the amount determined in step 800.

Referring again to step 810, if it is determined that the symbol represents a distance to a match and a string length, then the algorithm 20 continues to step 840 where the variable MATCH_LENGTH is decoded in the same manner is in step 830. Then, step 845 decodes the distance in a manner complementary to the manner the distance was encoded in sub-step 540 (FIG. 5B). From the distance, which is the distance within the section, the distance to the matching string in raster order is calculated in step 850. This calculation includes a simple transformation, given the number of sections per image and the known section dimensions.

Once the length of the matching string (MATCH_LENGTH) and the distance to the matching string (DISTANCE) have been determined from either step 835 or 850, the algorithm 20 in step 860 copies MATCH_LENGTH number of bytes from the image buffer position located at DISTANCE bytes back from the current focus point to the current focus point.

From step 860, 820 or 825 the algorithm 20 proceeds to step 865 where it is determined whether the end of the present row has been reached. If the end of the present row has not been reached, then the algorithm 20 returns to step 805 from where the next symbol is decoded.

In the case where the end of the present row in the image has been reached the algorithm 20 proceeds via step 870 to step 875 where it is determined whether the last row in the image as been processed. If more rows need to be processed, then the algorithm 20 returns to step 800. If all rows of the image have been processed (decoded) then the algorithm 20 finishes in step 880 where the next symbol is decoded and it is checked that that symbol correspond to an EOB marker.

The above description of step 875 assumes that the decompression algorithm 20 has knowledge of the number of rows in the image that as been compressed. In the case where the decompression algorithm 20 does not have such knowledge, steps 800 and 805 have to check whether the next symbol received is not the symbol corresponding to the EOB marker.

Even though the compression algorithm 10 has been optimised for speed, a compression ratio that is comparable to that achieved by the state of the art LZ-based compression algorithms is achieved. When the compression algorithm 10 is compared with LZ-based compression algorithms with similar compression ratios, the algorithm 10 has been found to be significantly faster.

The foregoing describes only some embodiments of the present invention, and modifications and/or changes call be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of compressing an image to an output stream, said image consisting of a plurality of pixels arranged in scanlines, said method comprising the steps of:
   (a) maintaining a set of reference points, each said reference point having a predetermined spatial relationship with a current pixel;
   (b) determining an adjustment along said scanlines of said reference points;
   (c) adjusting each of said reference points by said adjustment;
   (d) searching for a match between a string of consecutive pixels including said current pixel and each of the strings of consecutive previously scanned pixels including respective said adjusted reference points;
   (e) if a match is found, encoding an identifier for the reference point included in the match and the length of said matching string of consecutive pixels, to said output stream; and
   (f) repeating at least steps (d) and (e) for the pixel after the end of said string of consecutive pixels including said current pixel.

2. The method according to claim 1 wherein said adjustment is determined based upon a statistical probability of finding a string of consecutive previously scanned pixels including one of said adjusted reference points that matches said string of consecutive pixels including said current pixel.

3. The method according to claim 1 wherein said match has to satisfy a minimum length criterion before said encoding step is performed.

4. The method according to claim 1, wherein steps (b) and (c) are repeated at least once in every scanline.

5. The method according to claim 1, wherein said reference points are in vertical proximity to said current pixel.

6. The method according to claim 1 wherein, if a match is not found in step (d), said method comprises the further steps, following step (e), of:
   (e1) searching for a string of consecutive previously scanned pixels that matches said string of consecutive pixels including said current pixel by searching strings of consecutive previously scanned pixels having at least one pixel in vertical proximity to said current pixel, and
   (e2) if a match is found, encoding the distance from said current pixel to the string of consecutive previously scanned pixels, and the length of said string of consecutive pixels, to said output stream; and
      wherein the extent of pixels considered to be in vertical proximity to said current pixel is less than the length of said scanlines.

7. A method of compressing an image to an output stream, said image consisting of a plurality of pixels arranged in scanlines, said method comprising the steps of:
   (a) searching for a string of consecutive previously scanned pixels that matches a string of consecutive pixels including a current pixel by searching strings of consecutive previously scanned pixels having at least one pixel in vertical proximity to said current pixel, wherein at least one matching string of consecutive previously scanned pixels contains a pixel not in vertical proximity to said current pixel;
   (b) if a match is found, encoding the distance from said current pixel to the string of consecutive previously scanned pixels, and the length of said string of consecutive pixels, to said output stream; and
   (c) repeating steps (a) and (b) for the pixel after the end of said string of consecutive pixels including said current pixel,
      wherein the extent of pixels in vertical proximity to said current pixel is less than the length of said scanlines.

8. The method according to claim 7, wherein said searching step (a) comprises the sub-steps of:
   ai) computing a hash value for a current string including said current pixel;
   aii) locating in a hash table, and using said hash value, a most recent string matching said current sting;
   aiii) determining the maximum length of the string commencing with said current string that matches a previous string commencing with said most recent string; and
   aiv) if the distance from said current pixel to the first pixel in said most recent string, and the determined maximum length of said string, do not meet a criterion, locating in said hash table the next most recent string matching said current string and repeating steps aiii) and aiv).

9. The method according to claim 7, wherein said extent of pixels in vertical proximity to said current pixel are pixels within an image column range of said current pixel.

10. The method according to claim 9, wherein adjoining image column ranges overlap.

11. The method according to claim 7 wherein, if a match is not found, performing the further step of encoding said current pixel literally.

12. The method according to claim 11, wherein the literal encoding step uses a Move-To-Front model.

13. The method according to claim 7, wherein said encoding reduces the stochastic redundancy in said output stream by using a range coder with multiple probability models.

14. The method according to claim 13, wherein the probability models are order 0 quasi-static models.

15. An apparatus for compressing an image to an output stream, said image consisting of a plurality of pixels arranged in scanlines, said apparatus being configured to perform a method comprising the steps of:
   (a) maintaining a set of reference points, each said reference point having a predetermined spatial relationship with a current pixel;
   (b) determining an adjustment along said scanlines of said reference points;
   (c) adjusting each of said reference points by said adjustment;
   (d) searching for a match between a string of consecutive pixels including said current pixel and each of the strings of consecutive previously scanned pixels including respective said adjusted reference points;
   (e) if a match is found, encoding an identifier for the reference point included in the match and the length of said matching string of consecutive pixels, to said output stream; and
   (f) repeating at least steps (d) and (e) for the pixel after the end of said string of consecutive pixels including said current pixel.

16. A computer readable storage medium having recorded thereon a program, said program, when executed on a processing device, being configured to effect a method of compressing an image to an output stream, said image consisting of a plurality of pixels arranged in scanlines, said method comprising the steps of:

(a) maintaining a set of reference points, each said reference point having a predetermined spatial relationship with a current pixel;

(b) determining an adjustment along said scanlines of said reference points;

(c) adjusting each of said reference points by said adjustment;

(d) searching for a match between a string of consecutive pixels including said current pixel and each of the strings of consecutive previously scanned pixels including respective said adjusted reference points;

(e) if a match is found, encoding an identifier for the reference point included in the match and the length of said matching string of consecutive pixels, to said output stream; and (f) repeating at least steps (d) and (e) for the pixel after the end of said string of consecutive pixels including said current pixel.

17. An apparatus for compressing an image to an output stream, said image consisting of a plurality of pixels arranged in scanlines, said apparatus being configured to perform a method comprising the steps of:

(a) searching for a string of consecutive previously scanned pixels that matches a string of consecutive pixels including a current pixel by searching strings of consecutive previously scanned pixels having at least one pixel in vertical proximity to said current pixel;

(b) if a match is found, encoding the distance from said current pixel to the string of consecutive previously scanned pixels, and the length of said string of consecutive pixels, to said output stream, wherein at least one matching string of consecutive previously scanned pixels contains a pixel not in vertical proximity to said current pixel; and (c) repeating steps (a) and (b) for the pixel after the end of said string of consecutive pixels including said current pixel, wherein the extent of pixels in vertical proximity to said current pixel is less than the length of said scanlines.

18. A computer readable storage medium having recorded thereon a program said program, when executed on a processing device, being configured to effect a method of compressing an image to an output stream, said image consisting of a plurality of pixels arranged in scanlines, said method comprising the steps of:

(a) searching for a string of consecutive previously scanned pixels that matches a string of consecutive pixels including a current pixel by searching strings of consecutive previously scanned pixels having at least one pixel in vertical proximity to said current pixel, wherein at least one matching string of consecutive previously scanned pixels contains a pixel not in vertical proximity to said current pixel;

(b) if a match is found, encoding the distance from said current pixel to the string of consecutive previously scanned pixels, and the length of said string of consecutive pixels, to said output stream; and (c) repeating steps (a) and (b) for the pixel after the end of said string of consecutive pixels including said current pixel, wherein the extent of pixels in vertical proximity to said current pixel is less than the length of said scanlines.

* * * * *